(12) United States Patent
Lai et al.

(10) Patent No.: US 11,133,254 B2
(45) Date of Patent: Sep. 28, 2021

(54) HYBRID POWER RAIL STRUCTURE

(71) Applicant: TAIWAN SEMICONDUCTOR MANUFACTURING COMPANY, LTD., Hsinchu (TW)

(72) Inventors: Wei-An Lai, Hsinchu (TW); Jiann-Tyng Tzeng, Hsin Chu (TW); Wei-Cheng Lin, Taichung (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 16/559,547

(22) Filed: Sep. 3, 2019

(65) Prior Publication Data

US 2020/0105671 A1  Apr. 2, 2020

Related U.S. Application Data

(60) Provisional application No. 62/738,673, filed on Sep. 28, 2018.

(51) Int. Cl.
*H01L 23/528* (2006.01)
*H01L 23/48* (2006.01)
(Continued)

(52) U.S. Cl.
CPC .......... *H01L 23/5286* (2013.01); *G06F 30/39* (2020.01); *G06F 30/394* (2020.01); *H01L 21/76898* (2013.01); *H01L 21/823431* (2013.01); *H01L 21/823475* (2013.01); *H01L 23/481* (2013.01); *H01L 27/0886* (2013.01); *G03F 1/30* (2013.01); *G03F 1/32* (2013.01); *G03F 1/36* (2013.01); *G03F 7/2002* (2013.01); *G06F 2119/18* (2020.01)

(58) Field of Classification Search
CPC . H01L 23/5286; H01L 23/481; H01L 23/535; H01L 23/5386; H01L 27/0886; H01L 27/0203; H01L 27/0207; H01L 21/76898; H01L 21/823475; G06F 30/39; G06F 30/394; G06F 2119/18; G03F 1/32; G03F 1/36; G03F 1/30; G03F 7/2002
USPC ............... 257/621, 276, 532, 698, 712, 774, 257/E21.597, E21.641, E23.011, E23.153; 438/107, 122
See application file for complete search history.

(56) References Cited

U.S. PATENT DOCUMENTS 7,260,442 B2  8/2007  Hwang et al.
8,698,205 B2  4/2014  Tzeng et al.
(Continued)

*Primary Examiner* — Dao H Nguyen
(74) *Attorney, Agent, or Firm* — Hauptman Ham, LLP

(57) ABSTRACT

An integrated circuit structure includes a substrate having a front side and a back side, the back side being an opposite side of the substrate from the front side. A first power rail extends in a first direction, is embedded in the front side of the substrate, and provides a first supply voltage. A second power rail provides a second supply voltage different from the first supply voltage, extends in the first direction, is embedded in the front side of the substrate, and is separated from the first power rail in a second direction different from the first direction. A first device is positioned between the first power rail and the second power rail and located on the front side of the substrate. A first via structure extends to the back side of the substrate and is electrically coupled to the second power rail.

20 Claims, 16 Drawing Sheets

(51) Int. Cl.
- *H01L 27/088* (2006.01)
- *H01L 21/768* (2006.01)
- *H01L 21/8234* (2006.01)
- *G06F 30/39* (2020.01)
- *G06F 30/394* (2020.01)
- *G03F 1/32* (2012.01)
- *G03F 1/36* (2012.01)
- *G03F 7/20* (2006.01)
- *G03F 1/30* (2012.01)
- *G06F 119/18* (2020.01)

(56) References Cited

U.S. PATENT DOCUMENTS

| | | |
|---|---|---|
| 9,087,878 B2 | 7/2015 | Yu et al. |
| 9,256,709 B2 | 2/2016 | Yu et al. |
| 9,589,803 B2 | 3/2017 | Chen et al. |
| 10,115,679 B1 | 10/2018 | Kuo et al. |
| 2002/0020862 A1* | 2/2002 | Livengood .......... H01L 23/5286 257/276 |
| 2011/0304998 A1* | 12/2011 | Lin ....................... H05K 1/0253 361/783 |
| 2014/0040838 A1 | 2/2014 | Liu et al. |
| 2014/0225248 A1* | 8/2014 | Henderson .............. H01L 23/36 257/712 |
| 2015/0278429 A1 | 10/2015 | Chang |
| 2017/0162558 A1* | 6/2017 | Chu .................... H01L 27/0292 |
| 2020/0365509 A1* | 11/2020 | Sasaki ............... H01L 21/76897 |

\* cited by examiner

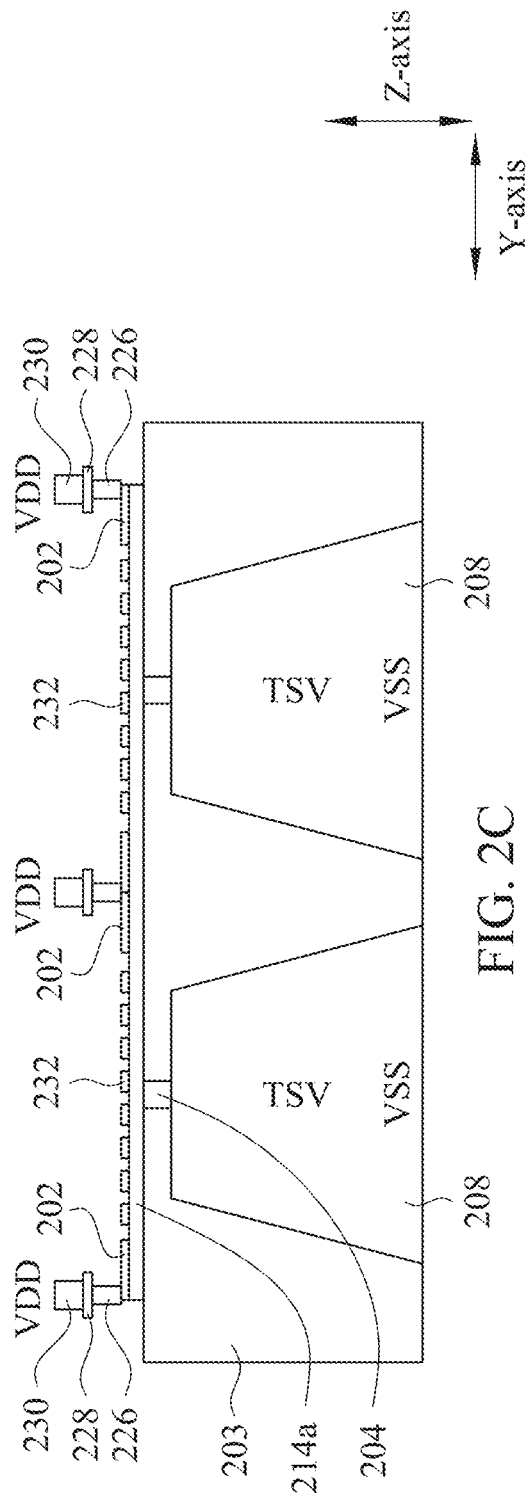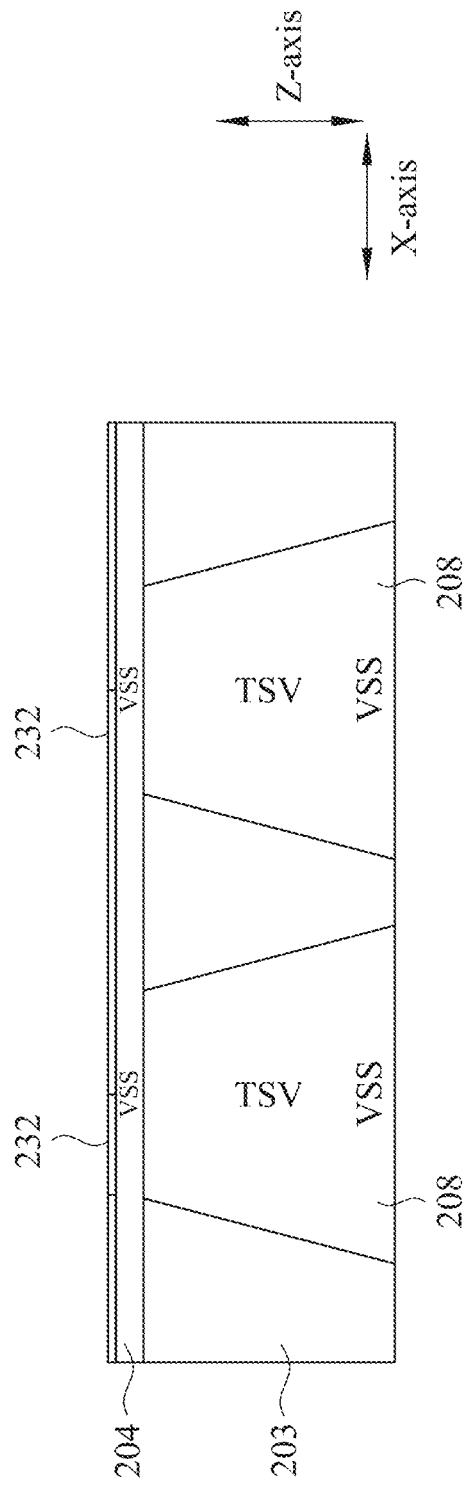

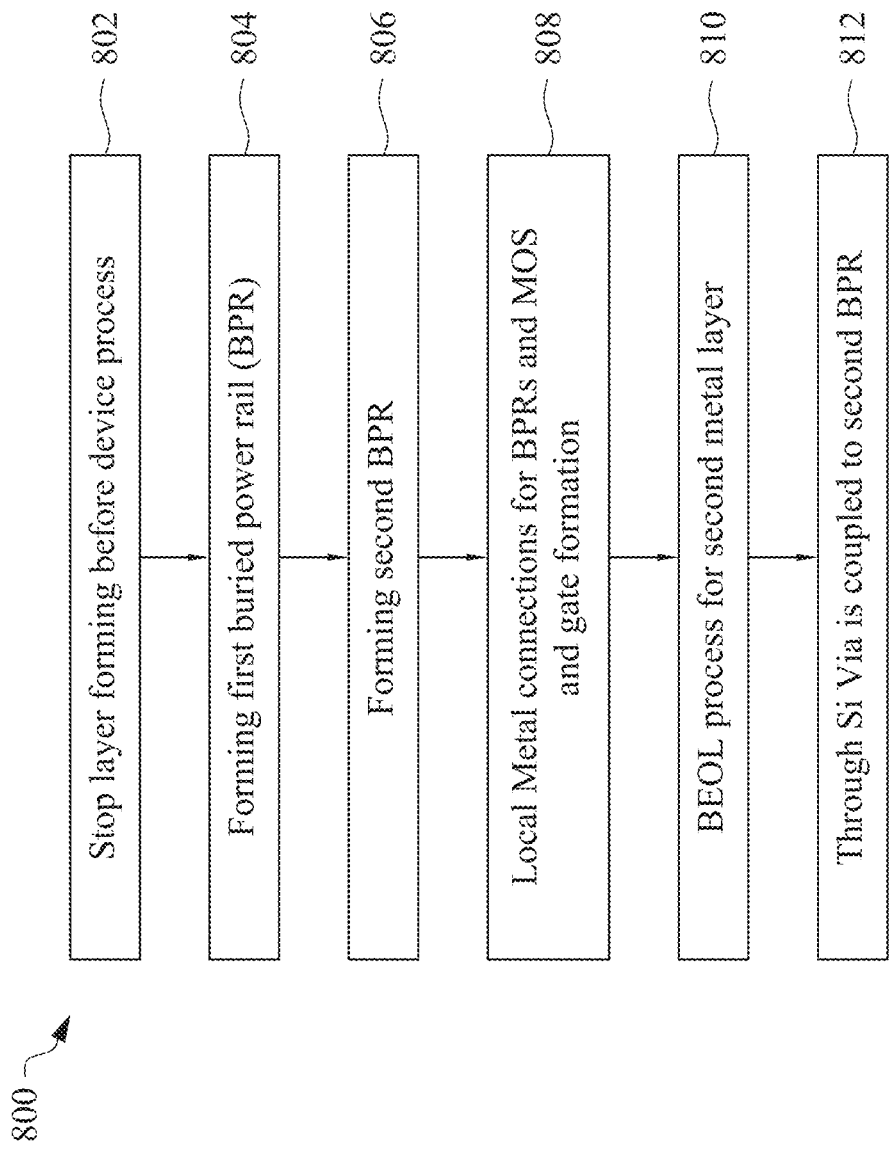

HYBRID POWER RAIL STRUCTURE

PRIORITY CLAIM AND CROSS-REFERENCE

This application claims priority to U.S. Provisional Patent Application Ser. No. 62/738,673 filed Sep. 28, 2018, which is incorporated herein by reference in its entirety.

BACKGROUND

Cells are elements for designing and building integrated circuits (IC). The cells are configured to form functional circuits. Typically, power rails are laid out on the boundaries of the cells to provide power for the cells to operate. As chip sizes get smaller, more efficient power rail structures are used to provide power to the cells.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 2A-2D are multiple views of an IC with a hybrid power rail (HPR) structure, in accordance with some embodiments.

FIG. 8 is a flowchart of a method of forming the HPR structure of FIG. 3, in accordance with one or more embodiments.

DETAILED DESCRIPTION

Figure 1:
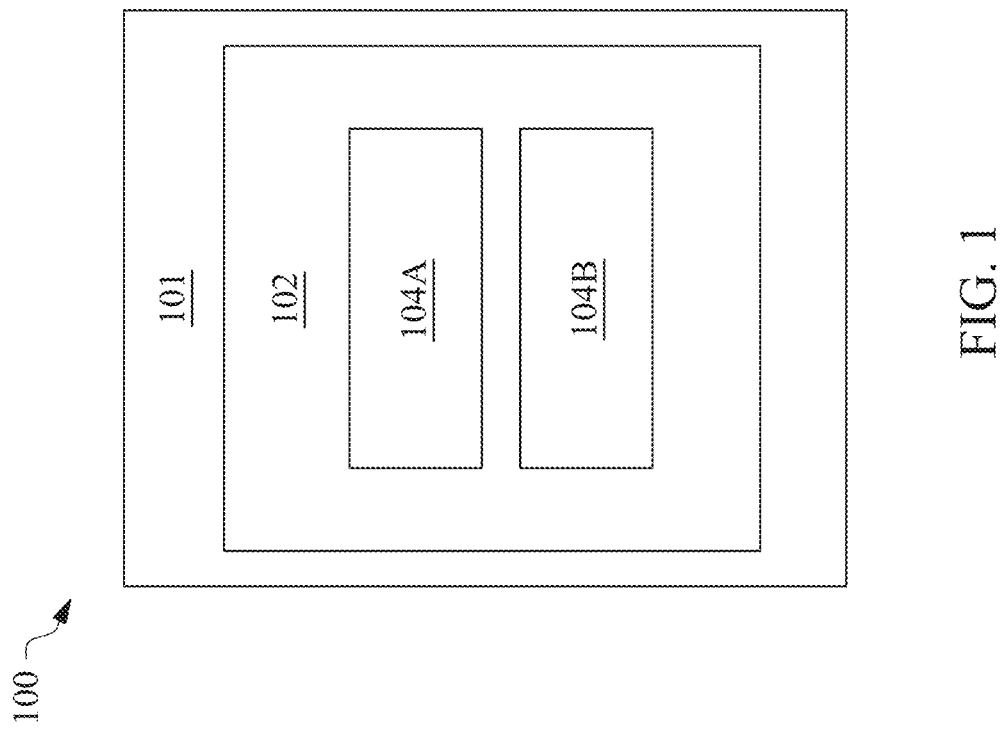
FIG. 1 is a block diagram of an IC having a semiconductor device, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure describes an implementation of an integrated circuit (IC) using a hybrid power rail (HPR) structure for providing power efficiently to the operational components of the IC. The HPR structure allows for power to be provided from the top and bottom of the substrate incorporating the HPR structure compared to power rail structures that only provide power from one side of the substrate. Moreover, the HPR structure reduces the effects of shorting associated with Through Silicon Via (TSV) critical dimensions (CD) and TSV overlay issues associated with buried power rails.

FIG. 1 is a block diagram of an IC 100 having a semiconductor device 101, in accordance with some embodiments. In FIG. 1, semiconductor device 101 includes, among other things, a circuit macro (hereinafter, macro) 102. In some embodiments, macro 102 is an SRAM macro. In some embodiments, macro 102 is a macro other than an SRAM macro. Macro 102 includes, among other things, one or more HPR arrangements 104A and 104B. An example of a layout diagram which is used to fabricate an HPR arrangement 104A with a single buried power rail includes the layout diagram of FIG. 3. An example of a layout diagram which is used to fabricate an HPR arrangement 104B with two buried power rails includes the layout diagram of FIG. 5.

Figure 2A:
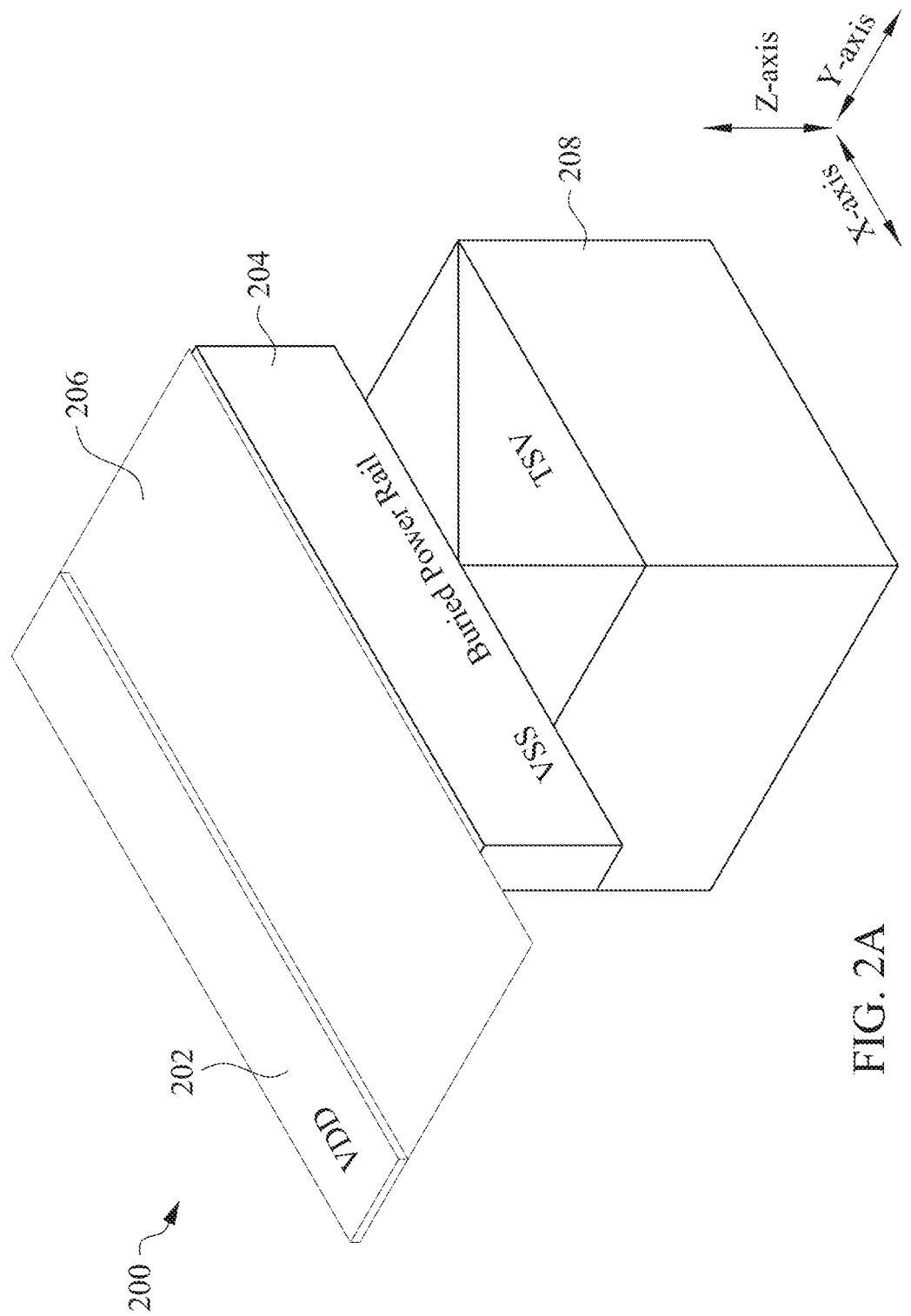

FIG. 2A is a perspective view of an HPR structure 200, in accordance with some embodiments. The HPR structure 200 is on, and at least partially in, a substrate 203 (FIG. 2C) and includes a first power rail 202, a second power rail 204, and a device structure 206. In one or more embodiments, device structure 206 includes more than one device structure. Each power rail is configured to supply a voltage to device structure 206. The second power rail 204 is also referred to as a buried power rail with reference to location of the power rail in the substrate in relation to device structure 206. The substrate has a front side and a back side opposite the front side. For clarity and ease of understanding, the substrate is not shown in FIG. 2A.

The first power rail 202 is a conductive structure positioned on the front side of the substrate and configured to supply a first voltage VDD, and the second power rail 204 is a buried power rail positioned on the front side of the substrate and configured to supply a second voltage VSS. In at least some embodiments, the second power rail 204 is positioned in the front side of the substrate. The HPR structure 200 also includes a through silicon via (TSV) 208 connected with the buried power rail 204 and extending through the back side of the substrate. TSV 208 is configured to supply a voltage to buried power rail 204. First voltage VDD differs from second voltage VSS. In some embodiments, the first power rail 202 is configured to supply second voltage VSS and the second power rail 204 is configured to supply first voltage VDD.

The first power rail 202 and the second "buried" power rail 204 extend in substantially parallel rows in a first direction (X-axis). The buried power rail 204 is embedded in the substrate and is separated from the first power rail 202 in a second direction (Y-axis) different from the first direction. The second direction (Y-axis) is substantially perpendicular to the first direction (X-axis). The buried power rail 204 is below the level of the first power rail 202 in a third direction (Z-axis) that is substantially perpendicular to both the first and second directions.

Device structure 206 is positioned between the first power rail 202 and the buried power rail 204. In at least one embodiment, device structure 206 includes one or more cells, also referred to as standard cells in some embodiments. In various embodiments, a cell includes a logic gate cell, a custom cell, an engineering change order cell, a memory cell, or another suitable circuit module. In some embodiments, a logic gate cell includes an AND, OR, NAND, NOR, XOR, INV, AND-OR-Invert (AOI), OR-AND-Invert (OAI), MUX, Flip-flop, BUFF, Latch, delay, or clock cell. In some embodiments, a memory cell includes a static random access memory (SRAM), a dynamic RAM (DRAM), a resistive RAM (RRAM), a magnetoresistive RAM (MRAM) or read only memory (ROM).

In various embodiments, a cell includes one or more passive and/or active devices. Examples of active devices include, but are not limited to, transistors and diodes. Examples of transistors include, but are not limited to, metal oxide semiconductor field effect transistors (MOSFET), complementary metal oxide semiconductor (CMOS) transistors, bipolar junction transistors (BJT), high voltage transistors, high frequency transistors, p-channel and/or n-channel field effect transistors (PFETs/NFETs), etc.), FinFETs, and planar MOS transistors with raised source/drain. Examples of passive devices include, but are not limited to, capacitors, inductors, fuses, and resistors.

Moreover, device structure 206 defines a region that includes a pitch at which the TSV 208 provides power via buried power rail 204. In a given implementation, a contacted poly pitch (CPP) defines a minimum center-to-center space between gates of adjacent transistors of one or more cell structures that are coupled to a single TSV structure, and the pitch of the TSV 208 is defined as a multiple of the CPP. In some embodiments, more than one TSV 208 is electrically coupled with buried power rail 204 in order to provide a voltage to more than one device structure 206.

TSV 208 is in the substrate and configured to electrically connect the buried power rail 204 to a backside power source configured to supply the second voltage VSS. TSV 208 extends through the back side of the substrate to electrically connect with buried power rail 204. The buried power rail 204 is electrically connected with and positioned on the TSV 208 and configured to receive the second voltage VSS. TSV 208 is substantially larger in plan view dimensions and pitch than in other approaches lacking the HPR structure. In some embodiments, TSV 208 is dimensioned to be greater than two times the height of a cell height of a cell of device structure 206. In some embodiments, TSV 208 has a length ranging from 250 nanometers (nm) to 500 nm. In some embodiments, TSV 208 has a width ranging from 250 nm to 500 nm. In some embodiments, TSV 208 has a height ranging from 1 micrometer (µm) to 2µm. In some embodiments, TSV 208 has a pitch ranging from 16 to 60 CPP.]

In power grid structures, there is a likelihood of TSV overlay errors when the TSV is not aligned with a power rail which can result in short circuits. The TSV CDs are the sizing dimensions to ensure reliable manufacturing and functioning of TSV structures. TSV CDs include TSV etch depth, TSV diameter, and TSV etch profile. If one or more of the TSV CDs are outside manufacturing limits, the TSV will potentially cause a short circuit of a power grid structure. Multiple TSV structures increase the likelihood of TSV overlay and TSV CD issues which results in an increased likelihood of a short circuited power grid.

In some embodiments, HPR structure 200 lowers the risks involving TSV CDs by using a single TSV 208 as described above. Moreover, the HPR structure 200 does not require aligning multiple buried power rails with multiple TSVs thereby reducing the likelihood of TSV overlay errors. The buried power rail 204 is aligned with the TSV structure 208 lowering the chances of producing TSV overlay errors. The first power rail 202 does not contact the TSV 208. Moreover, the TSV 208 is larger in comparison to TSVs used in other approaches lacking the HPR structure. TSV CDs and TSV overlay limit the size of TSV structures used in power grid structures.

The HPR structure 200 combines the first power rail 202 with the second "buried" power rail 204 to provide power to device structure 206. Moreover, in some embodiments, the HPR structure 200 utilizes only a single TSV structure 208 for backside power minimizing the effects of TSV CD and TSV overlay errors seen with other power grid structures having multiple TSV structures wherein alignment and overlay errors result in short circuits.

Figure 2B:
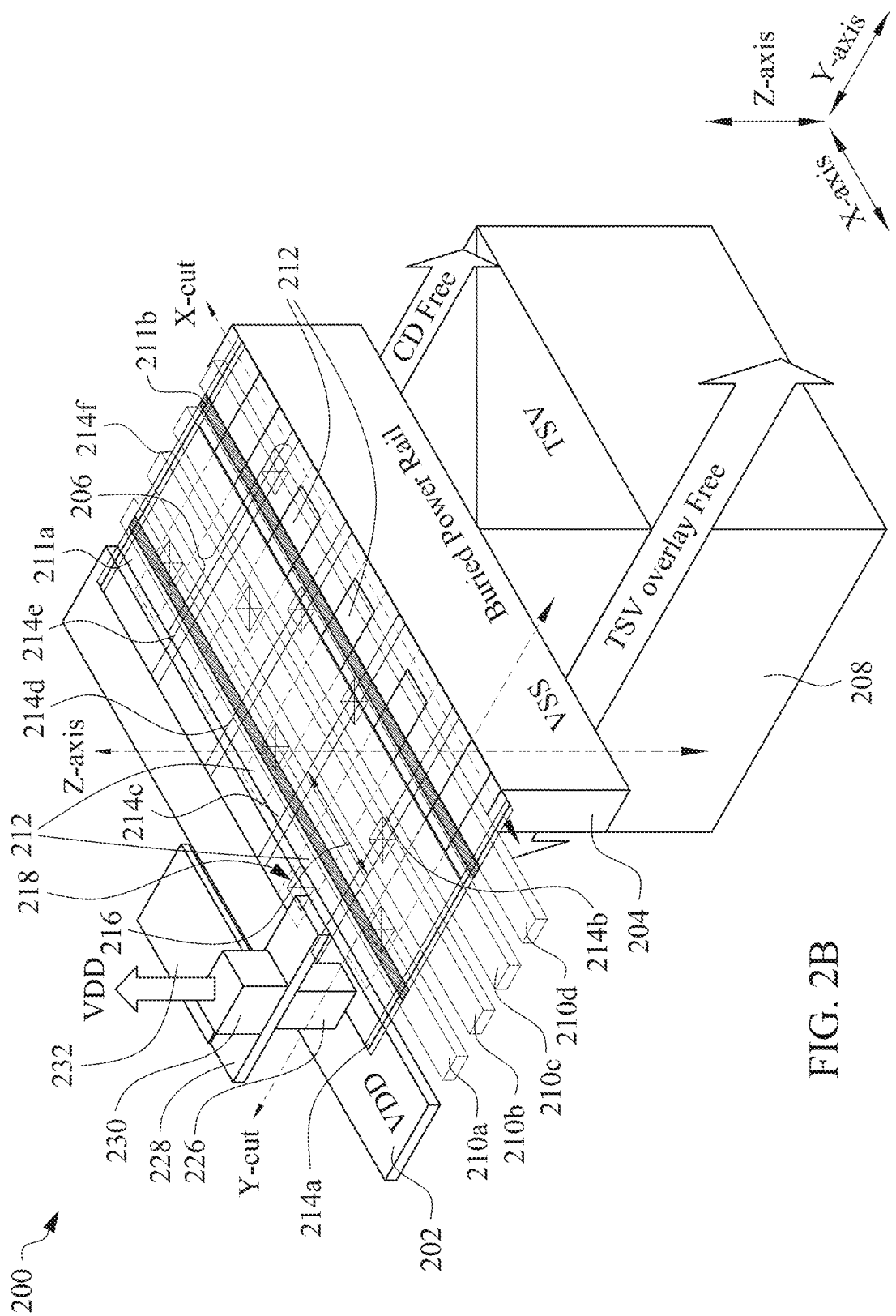

FIG. 2B is a perspective view of HPR structure 200 including further details regarding the implementation of a number of passive and active devices. In particular, the device structure 206 includes a number of first metal tracks 210a-210d (collectively referred to as first metal tracks 210). The first metal tracks 210a-210d extend in substantially parallel rows in the first direction (X-axis). Active regions 211a-211b (collectively referred to as active regions 211) each overlap a portion of and are positioned below the first metal tracks 210a and 210c. The active regions 211 extend substantially parallel along the first direction (X-axis). Metal contact diffusion structures 212 are positioned on active regions 210a-210b to form the passive or active devices of the device structure 206. The metal contact diffusion structures 212 extend in substantially parallel columns in the second direction (Y-axis). Polysilicon gate structures 214a-214f (collectively referred to as polysilicon gate structures 214) are positioned beneath, along the Z-axis, the first power rail 202. The polysilicon gate structures 214 extend in substantially parallel columns in the second direction and substantially parallel to the metal contact diffusion structures 212. The regions between each of the polysilicon gate structures 214a-214e are cell regions 216. HPR structure 200 includes 5 cell regions 216 and 4 first metal tracks 210. The active regions 210 are positioned beneath, along the Z-axis, the polysilicon gate structures. In some embodiments, device structure 206 includes more or less than 5 cell regions 216. In various embodiments, one or more cell regions 216 combine to form a given cell as discussed above with respect to device structure 206.

HPR structure 200 includes a via structure 218 that electrically connects the first power rail 202 to one of the metal contact diffusion structures 212. Via structures electrically connect a select number of the first metal tracks 210 to a certain number of the metal contact diffusion structures 212. Moreover, via structures electrically connect a certain number of the polysilicon gate structures 214b-214e to the first metal tracks 210.

In some embodiments, via structure 218 is a square via. In some embodiments, via structure 218 is a hole etched in an interlayer dielectric that is filled with a metal. In some embodiments, via structure 218 is a buried via. In some embodiments, via structure 218 is replaced with layered metal pairs.

A via structure 226 electrically connects a first conductive structure 228 to the first power rail 202. A via structure 230 is on the first conductive structure 228. The via structure 230 electrically connects a second conductive structure 232 to the first conductive structure 228. The first conductive structure 228 extends along the second direction, and the second conductive structure 232 extends along the first direction. The first conductive structure 228 and the second conductive structure 232 are electrically connected to the first power rail 202 configured to supply the first voltage VDD. The arrangement of the via structure 226, the first conductive structure 228, the via structure 230, and the second conductive structure 232 extends in a third direction (Z-axis) perpendicular to the first direction and second direction. The first conductive structure 228 and the second conductive structure 232 extends above the transistor plane that includes the device structure 206. In some embodiments, the first conductive structure 228 and second conductive structure 232 reside in different metallization layers of the semiconductor.

In some embodiments, the first conductive structure 228 and the second conductive structure 232 are in different metallization layers. In some embodiments, additional conductive structures and via structures are added after the second conductive structure 232. In some embodiments, via structures 226 and 230 are square vias. In some embodiments, via structures 226 and 230 are holes etched in an interlayer dielectric that are filled with a metal. In some embodiments, via structures 226 and 230 are buried vias. In some embodiments, via structures 226 and 230 are different from each other in shape, dimensions, and materials. In some embodiments, via structures 226 and 230 are replaced with layered metal pairs.

FIG. 2C is a cross-sectional view of the HPR structure 200 of FIG. 2B. In particular, FIG. 2C is the cross-sectional view of the Y-cut of the HPR structure 200, as shown in FIGS. 2A and 2B. A substrate 203 surrounds the buried power rail 204 and the TSV 208. The polysilicon gate structure 214a is above the buried power rail 204 and below the first power rail 202. FIG. 2C includes the first via structure 226 on the first power rail 202 and the first conductive structure 228 on the first via structure 226. The second via structure 226 is on the first conductive structure 228. The two TSVs 208 each provide power to their respective power rails 204. A separation (not labeled) between the TSVs 208 in the second direction (Y-axis) is sufficient to avoid overlay errors or TSV CD issues. In some embodiments, the separation between the TSVs in the second direction ranges from 0.5 μm to 5.0 μm.

FIG. 2D is another cross-sectional view of the HPR structure 200 of FIG. 2B. In particular, FIG. 2D is the cross-sectional view of the X-cut of the HPR structure 200, as shown in FIG. 2B. Similar to FIG. 2C, the substrate 203 surrounds the buried power rail 204 and the TSV 208. The buried power rail 204 is on the TSV 208. The long axis of the buried power rail 204 extends along the first direction (X-axis). A separation not labeled) between the TSVs 208 in the first direction (X-axis) is sufficient to avoid overlay errors or TSV CD issues. In some embodiments, the separation between the TSVs in the first direction ranges from 0.5 μm to 5.0 μm.

Figure 3:
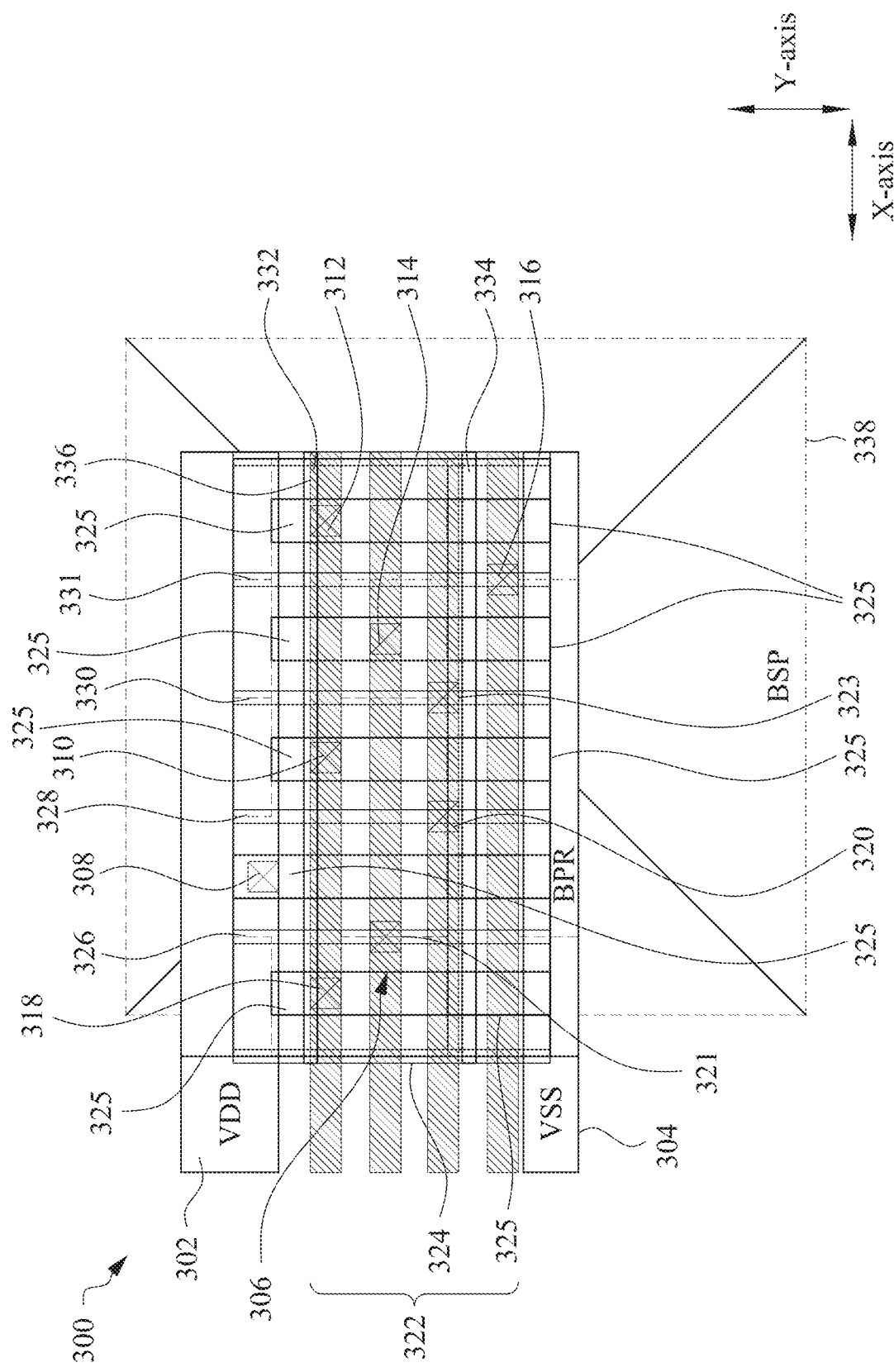
FIG. 3 is a layout diagram of an IC with an HPR structure, in accordance with some embodiments.

FIG. 3 is a layout diagram 300 of an integrated circuit (IC) with the hybrid power rail (HPR) structure 200 of FIG. 2A, in accordance with some embodiments. The layout 300 includes a first power rail layout pattern 302 (corresponding to first power rail 202), a buried power rail layout pattern 304 (corresponding to buried power rail 204), a first device pattern 306 (corresponding to device structure 206), a number of via patterns 310, 312, 314, 316, 318, 320, 321, and 323, and metal track patterns 322. The long axis of the first power rail layout pattern 302 and the buried power rail layout pattern 304 extends along a first direction (X-axis). The first power rail layout pattern 302 corresponds to a conductive structure configured to provide a first supply voltage VDD. The buried power rail layout pattern 304 corresponds to a conductive structure configured to provide a second supply voltage VSS. The first power rail pattern 302 and the buried power rail pattern 304 and extend in substantially parallel rows in the first direction (X-axis). The buried power rail 304 is separated from the first power rail 302 in a second direction (Y-axis) different and substantially perpendicular to the first direction (X-axis).

The first device pattern 306 is between the power rail pattern 302 and the buried power rail pattern 304. The first device pattern 306 includes a number of first metal track patterns 322. The first metal track patterns 322 extend in substantially parallel rows in the first direction (X-axis). The metal contact diffusion patterns 325 are on active region patterns 334 and 336 and extend substantially parallel in columns along the second direction (Y-axis). The regions between each of the polysilicon gate patterns 324, 326, 328, 330, 331, and 332 are cell regions 329. There are 5 cell regions 329 and 4 metal tracks patterns 322. In some embodiments, there are more than 5 cell regions in the first device pattern 306.

Via patterns 308, 310, 312, 314, and 318, are between a select number of the first metal track patterns 322 and a select number of the metal contact diffusion patterns 325. Via patterns 316, 320, 321, and 323 are between the polysilicon gate patterns 326, 328, 330, and 331 and the first metal track patterns 322. The first device pattern 306 represents a number of active and passive devices formed on the active region patterns 334 and 336.

In some embodiments, via patterns 308, 310, 312, 314, 316, 318, 320, 321, and 323 are square via patterns. In some embodiments, via patterns 308, 310, 312, 314, 316, 318, 320, 321, and 323 are buried via patterns. In some embodiments, via patterns 308, 310, 312, 314, 316, 318, 320, 321, and 323 are different from each other in shape and size. In some embodiments, via patterns 308, 310, 312, 314, 316, 318, 320, 321, and 323 are replaced with layout patterns of layered metal pairs.

A TSV pattern 338 is provided where the buried power rail pattern 304 is positioned on the TSV pattern 336. The first power rail pattern 302 is not in contact with the TSV pattern 338.

In some embodiments, the layout diagram 300 includes a pick-up cell pattern (not shown) corresponding to a pick-up cell structure as discussed below with respect to FIG. 4.

Figure 4:
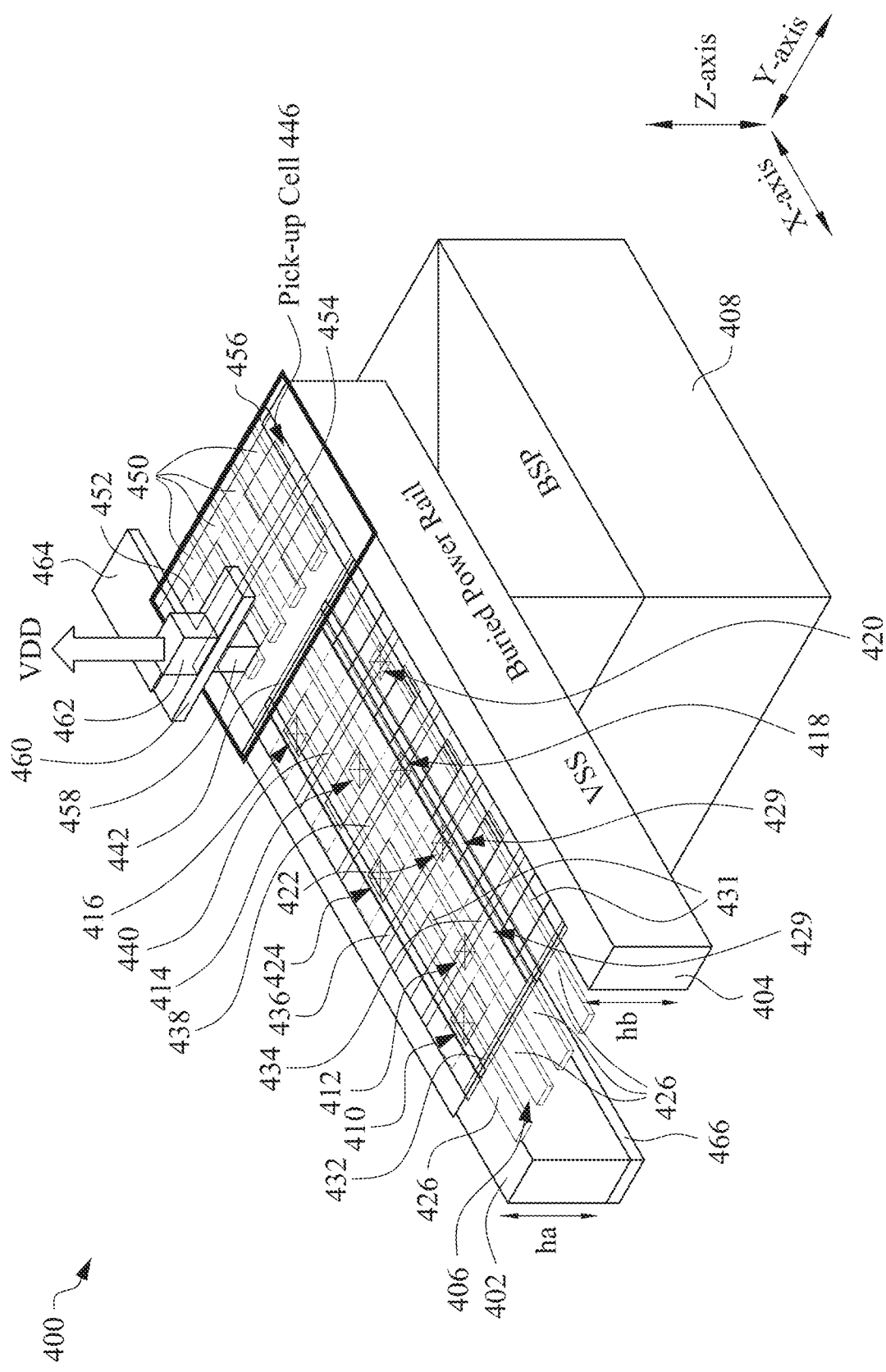
FIG. 4 is a schematic diagram of an IC of an HPR structure having two buried power rail structures, in accordance with some embodiments.

FIG. 4 is a perspective view of an HPR structure 400 having two buried power rail structures, in accordance with some embodiments. The HPR structure 400 includes a first buried power rail 402 and a second buried power rail 404 formed in a substrate. Moreover, the HPR structure 400 includes a first device structure 406 having passive or active devices and via structures 410, 412, 414, 416, 418, 420, 422, and 424 to establish electrical connections.

The first buried power rail 402 is configured to provide a first supply voltage VDD through a pick-up cell structure 446 or other electrical contact as discussed below, and the second buried power rail 404 is configured to provide a second supply voltage VSS. The first buried power rail 402 and the second buried power rail 404 are arranged substantially in parallel in rows. The second buried power rail 404 is configured to provide a second supply voltage VSS different from the first supply voltage VDD. The long axis of the first buried power rail 402 and the second buried power rail 404 extends along a first direction (X-axis). The second buried power rail 404 is separated from the first power rail 402 in a second direction (Y-axis) different and substantially perpendicular to the first direction (X-axis).

The first device structure 406 is between the first buried power rail 302 and the second buried power rail 404. The first device structure 406 is located above the first buried power rail 402 and the second buried power rail 404. The first device structure 406 includes a number of first metal tracks 426. The first metal tracks 426 are arranged substantially in parallel in columns and extending along the first direction (X-axis). Active regions 428 and 430 are at selective locations in the first device structure 406 to form a number of active or passive devices of the first device structure 406. The active regions 428 and 430 are arranged and extend substantially parallel in rows along the first direction (X-axis). A number of contact metal diffusion structures 431 are on the active regions 428 and 430 to form various passive and active structures. The contact metal diffusion structures 431 are arranged in columns and extend substantially in parallel in the second direction (Y-axis).

Polysilicon gate structures 432, 434, 436, 438, 440, and 442 are arranged substantially in parallel in columns and extending along the second direction. The regions between polysilicon gate structures 432, 434, 436, 438, 440, and 442 form cell regions 429. In this case, there are 5 cell regions and 4 metal tracks. In some embodiments, there are more or less than 5 cell regions in the first device 406.

Via structures 410, 414, 416, and 424, electrically connect a select number of the first metal tracks 426 to a select number of the metal contact diffusion structures 431. Via structures 412, 418, 420, 422 electrically connect the polysilicon gate structures 434, 436, and 438 to the first metal tracks 426. First device structure 406 represents a number of active and passive devices formed therein.

In some embodiments, via structures 410, 412, 414, 416, 418, 420, 422, and 424 are square vias. In some embodiments, via structures 410, 412, 414, 416, 418, 420, 422, and 424 are holes etched in an interlayer dielectric that is filled with a metal. In some embodiments, via structures 410, 412, 414, 416, 418, 420, 422, and 424 are buried vias. In some embodiments, via structures 410, 412, 414, 416, 418, 420, 422, and 424 are different from each other in shape, size, and materials. In some embodiments, via structures 410, 412, 414, 416, 418, 420, 422, and 424 are replaced with layered metal pairs.

A TSV 408 is configured to connect the second buried power rail 404 to the power source VSS. The first buried power rail 402 does not come into contact with the TSV 408. The first buried power rail 402 and the second buried power rail 404 are each configured to be embedded in the substrate. The height ha of the first buried power rail 402 and the height hb of the second buried power rail 404 are different, where hb>ha. A protective layer 466 is positioned beneath the first buried power rail 402 to protect the bottom surface of the first buried power rail 402 from damage and coming into contact with the TSV 408. In some embodiments, the protective layer 466 is an insulator. In some embodiments, the protective layer 466 is not required.

By using different heights, ha and hb, of the first buried power rail 402 and the second buried power rail 404, the issues regarding short circuiting caused by TSV overlay errors and TSV CDs are minimized. The height ha is selected so that the first buried power rail 402 does not come into contact or is electrically coupled to TSV 408 thereby reducing the risk of a short circuit. The height hb is selected so that the second buried power rail 404 is electrically coupled to TSV 408. The second buried power rail 404 is the only structure that is to be electrically coupled to the TSV 408 for backside power, which alleviates the issues of misalignment associated with TSV overlay errors. If the first buried power rail 402 is also electrically coupled to the TSV 408, then overlay errors and TSV CD issues will arise because the second buried power rail is the only buried power rail specifically configured to be electrically coupled to TSV 408. Moreover, in some embodiments, HPR structure 400 includes a single TSV structure in order to minimize issues regarding TSV CDs.

In the embodiment depicted in FIG. 4, the HPR structure 400 includes the pick-up cell structure 446 configured to extend the HPR structure 400 along a third direction (Z-axis) perpendicular to the first direction and the second direction, thereby providing a portion of a conductive path between the first buried power rail 402 and an external voltage supply (not shown) configured to the first supply voltage VDD as discussed below.

The pick-up cell structure 446 includes at least one contact metal diffusion structure 452 electrically connected to the first buried power rail 402. One or more metal tracks 450 are electrically connected to the at least one contact metal diffusion structure 452 through at least one via structure (not shown). The one or more metal tracks 450 are arranged substantially in parallel in rows and extending along the first direction (X-axis). The pick-up cell structure 446 also includes polysilicon gate structure 442 discussed above and polysilicon gate structures 454 and 456 arranged substantially in parallel in columns and extending along the second direction (Y-axis). At least one via structure 458 is positioned on the one or more metal tracks 450, and electrically connects a first conductive structure 460 to the one or more metal tracks 450. The long axis of the first conductive structure 460 extends along the second direction (Y-axis). A via structure 462 is positioned on the first conductive structure 460, and electrically connects the first conductive structure 460 to a second conductive structure 464. The long axis of the second conductive structure 464 extends along the first direction (X-axis). The second conductive structure 464 is configured to carry the first supply voltage VDD.

By the configuration discussed above, the pick-up cell structure 446 provides an electrical connection between the external voltage supply and the first buried power rail 402.

In some embodiments, the long axis of the first conductive structure 460 extends along the first direction (X-axis). In some embodiments, the long axis of the second conductive structure 464 extends along the second direction (Y-axis). In some embodiments, the power connections are a hole, a trench, or both.

Figure 5:
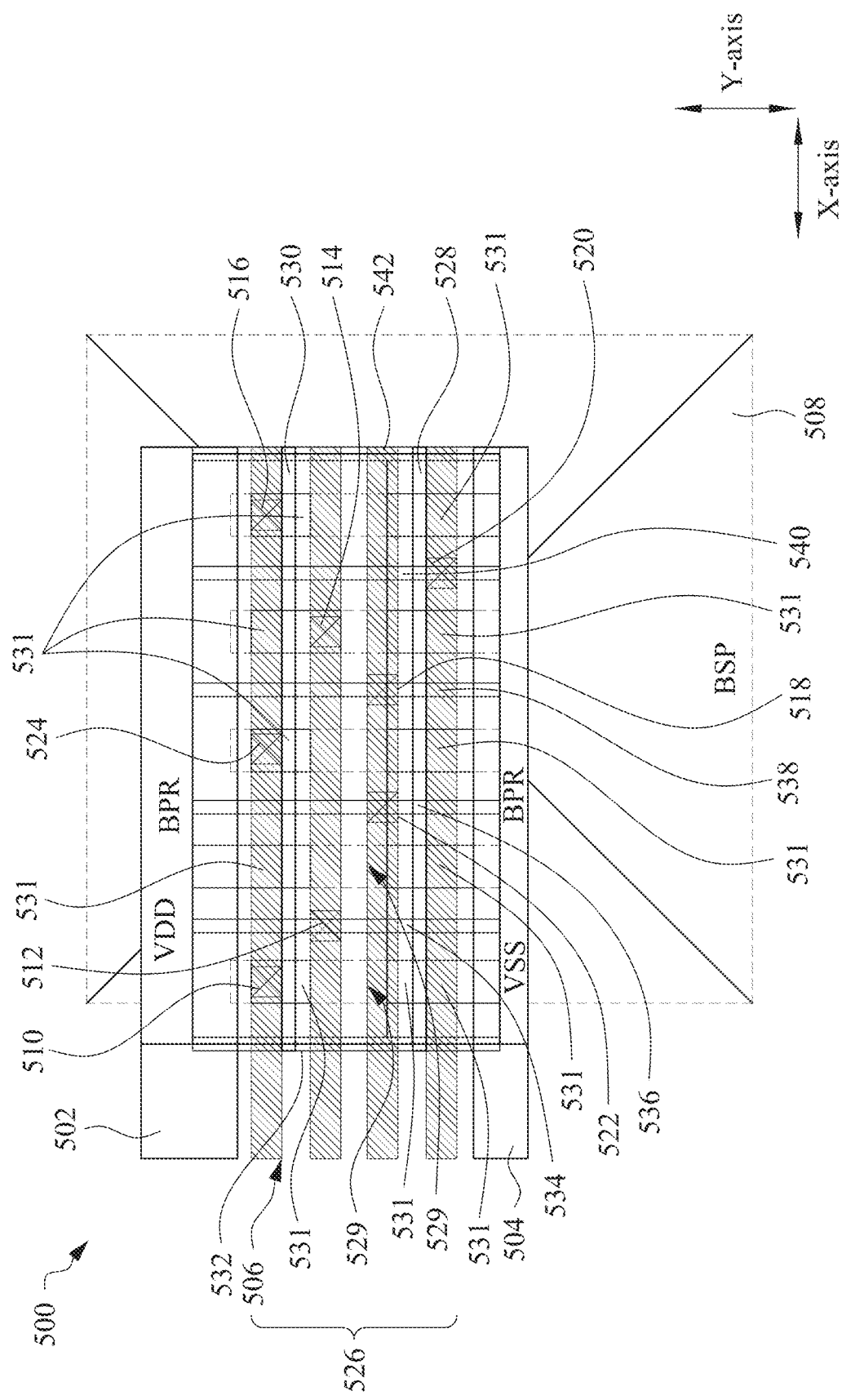
FIG. 5 is layout diagram of an IC of an HPR structure having two buried power rail structures, in accordance with some embodiments.

FIG. 5 is a layout diagram 500 of an integrated circuit (IC) with the hybrid power rail (HPR) structure 400 of FIG. 4, in accordance with some embodiments. The layout 500 includes a first buried power rail pattern 502 and a second buried power rail pattern 504. Moreover, the layout 500 includes a first device pattern 506, for representing passive or active devices, and via patterns 510, 512, 514, 516, 518, 520, 522, and 524 to represent electrical connections.

The first buried power rail pattern 502 and the second buried power rail pattern 504 are arranged in substantially parallel rows. The long axis of the first buried power rail pattern 502 and the second buried power rail pattern extends 504 along a first direction (X-axis). The second power rail pattern 504 is separated from the first power rail pattern 502 in a second direction (Y-axis) different from the first direction.

The first device pattern 506 is between the first power rail pattern 502 and the second power rail pattern 504. The first device pattern 506 is above the first buried power rail pattern 502 and the second buried power rail pattern 504. The first device pattern 506 includes a number of first metal track patterns 526. The first metal track patterns 526 are arranged in substantially parallel columns and extending along the first direction (X-axis). Active region patterns 528 and 530 are at selective locations in the first device pattern 506 to form a number of active or passive devices. The active region patterns 528 and 530 are arranged in substantially parallel rows and extend along the first direction (X-axis). A number of contact metal diffusion patterns 531 are on the active region patterns 528 and 530 to form various passive and active structures in the first device pattern 506. The contact metal diffusion patterns 531 are arranged in substantially parallel columns and extending in the second direction (Y-axis).

Polysilicon gate patterns 532, 534, 536, 538, 540, and 542 are arranged in substantially parallel columns and extending in the second direction. The regions between polysilicon gate patterns 532, 534, 536, 538, 540, and 542 define cell regions 529. In this case, there are 5 cell regions and 4 metal track patterns. In some embodiments, there are more or less than 5 cell regions formed in the first device pattern 506.

Via patterns 510, 514, 516, and 524, are positioned between a select number of the first metal track patterns 526 and a select number of the metal contact diffusion patterns 531. Via patterns 512, 518, 520, 522 are positioned between the polysilicon gate patterns 434, 436, and 438 and the first metal track patterns 426.

In some embodiments, via patterns 510, 512, 514, 516, 518, 520, 522, and 524 are square via patterns. In some embodiments, via patterns 510, 512, 514, 516, 518, 520, 522, and 524 are patterns of holes etched in an interlayer dielectric that is filled with a metal. In some embodiments, via patterns 510, 512, 514, 516, 518, 520, 522, and 524 are buried via patterns. In some embodiments, via patterns 510, 512, 514, 516, 518, 520, 522, and 524 are different from each other in shape and size. In some embodiments, via patterns 510, 512, 514, 516, 518, 520, 522, and 524 are buried via patterns. In some embodiments, the via patterns 510, 512, 514, 516, 518, 520, 522, and 524 are replaced with patterns of layered metal pairs.

The first buried power rail pattern 502 and the second buried power rail pattern 504 are each on the TSV pattern 508. The height of the first buried power rail pattern 502 is different from the height of the second buried power rail pattern 504.

In some embodiments, the layout diagram 500 includes a pick-up cell pattern (not shown) corresponding to a pick-up cell structure as discussed above with respect to FIG. 4.

Figure 6:
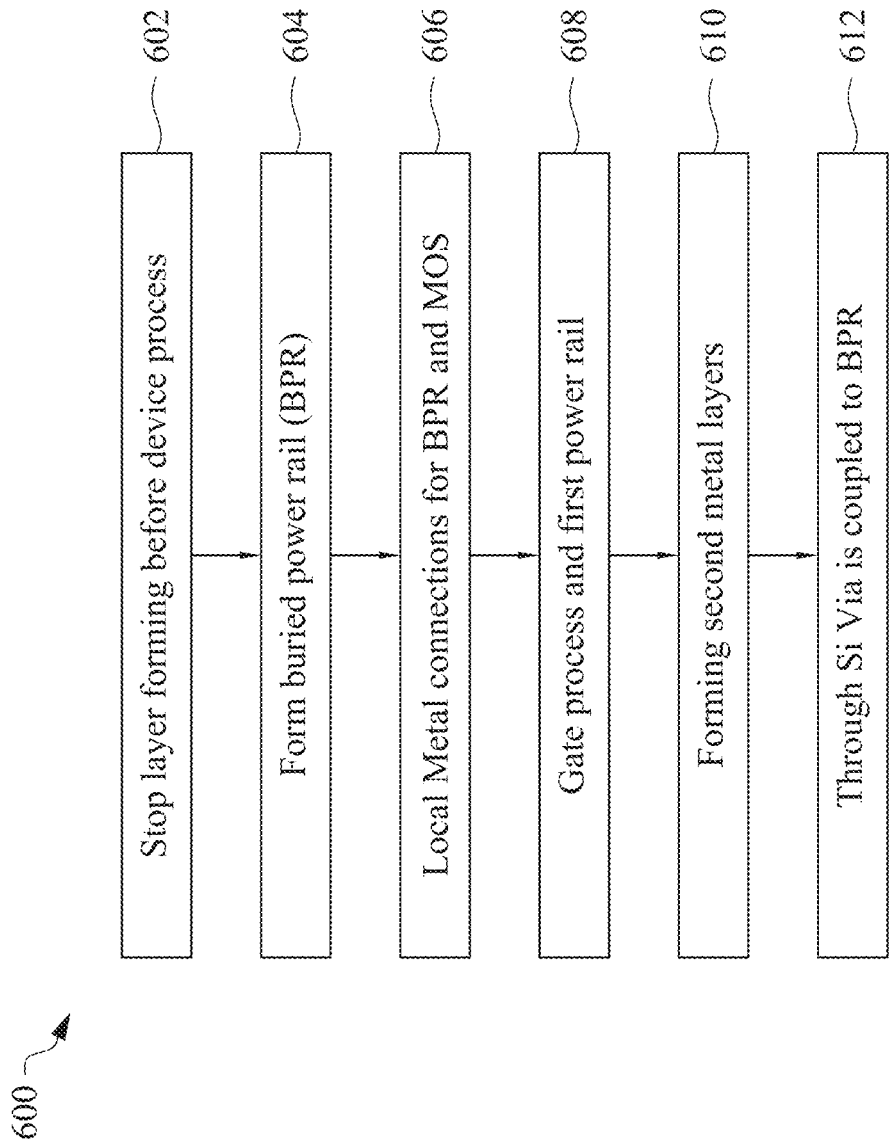
FIG. 6 is a flowchart of a method of forming the HPR structure of FIG. 1, in accordance with one or more embodiments.

FIG. 6 is a flowchart of a method 600 of forming the HPR structure 200 (FIG. 2B), in accordance with one or more embodiments. FIGS. 7A-7F are diagrams of the HPR structure 200 at various manufacturing stages corresponding to the operations of method 600, in accordance with some embodiments. Method 600 is executable to form HPR structure 200, discussed above with respect to FIGS. 2A-2D, and HPR structure 700 is usable as HPR structure 200, in some embodiments.

The sequence in which the operations of method 600 are depicted in FIG. 6 is for illustration only; the operations of method 600 are capable of being executed in sequences that differ from that depicted in FIG. 6. In some embodiments, operations in addition to those depicted in FIG. 6 are performed before, between, during, and/or after the operations depicted in FIG. 6.

Figure 7A:
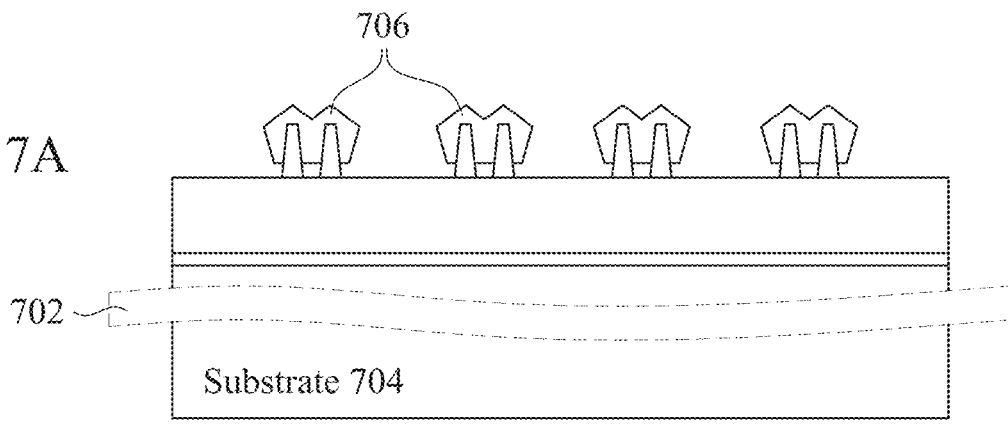
FIGS. 7A-7F are diagrams of an HPR structure at various manufacturing stages corresponding to the method of FIG. 4, in accordance with one or more embodiments.

At operation 602, a stop layer 702 is formed before the device structures 706 are formed. The stop layer 702 is formed by depositing, using chemical vapor deposition or the like, silicon nitride, silicon oxy-nitride, silicon carbide, or carbon-doped silicon nitride or the like. Details regarding an embodiment of a process usable to form a stop layer are found in U.S. Pat. No. 9,589,803 issued Mar. 7, 2017, which is incorporated herein by reference in its entirety. The stop layer 702 is formed on a substrate 704, as shown in FIG. 7A. Afterwards, the device structures 706 are formed on the substrate 704.

Figure 7B:
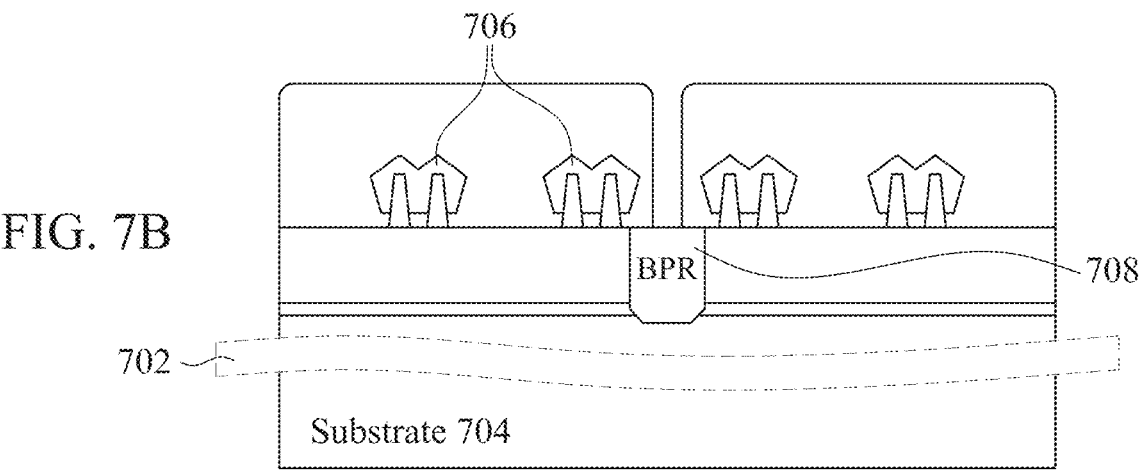

At operation 604, a trench process is used to form a trench in substrate 704, as shown in FIG. 7B. The trench process involves etching on the substrate 704 using techniques including wet etching, dry etching, sputtering etching or the like. Details regarding an embodiment of a process usable to form a trench are found in U.S. Pat. No. 10,115,679 issued Mar. 13, 2018, which is incorporated herein by reference in its entirety. After the trench is formed, conductive material is deposited in the trench to form the buried power rail (BPR) 708.

Figure 7C:
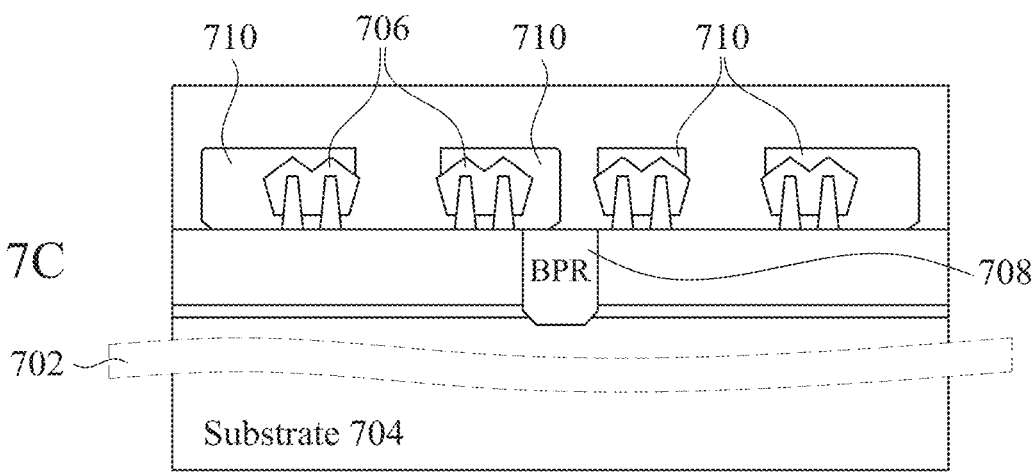

At operation 606, local metal connections 710 are formed for the buried power rail 708 and the device structures 706, as shown in FIG. 7C. The local metal connections 710 are used to form the source and drain of the device structures 706.

Figure 7D:
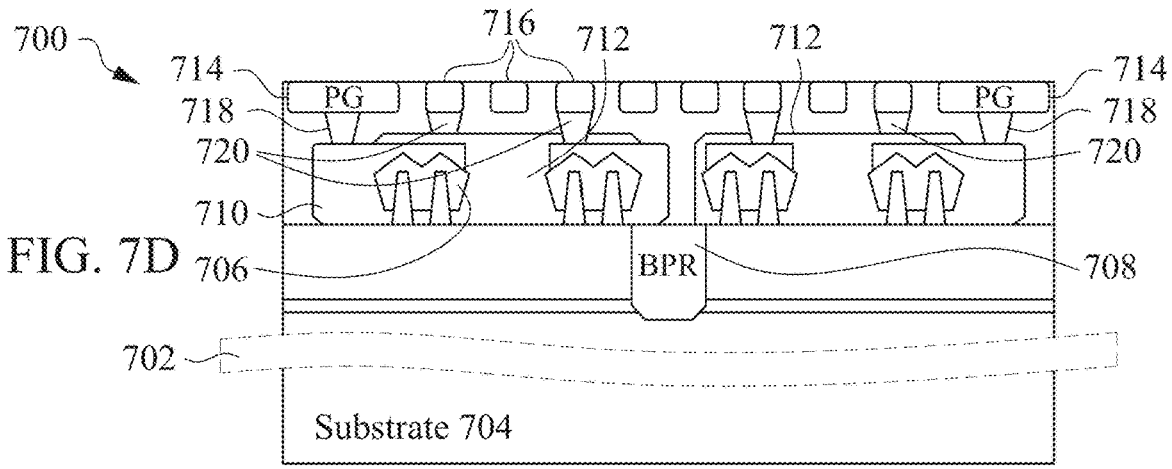

At operation 608, the polysilicon gate structures 712 are formed on the substrate 704, as shown in FIG. 7D. The polysilicon gate structures are formed by depositing polysilicon in gate strips. The gate strips are formed using processing operations of oxide deposition, polysilicon deposition, etching and sidewall formation before or after active source and drain diffusion implantation, thermal annealing, or other suitable process. Details regarding an embodiment of a process usable to form a polysilicon gate structure are found in U.S. Pat. No. 8,698,205 issued Apr. 15, 2014, which is incorporated herein by reference in its entirety. The polysilicon gate structures 712 are between the device structures 706 and substrate 704. The first power rail 714 and metal tracks 716 are formed. A number of the metal tracks 716 are on via structures 720 for electrical connections with the device structure 706. The first power rail 714 is connected to a via structure 718 to provide power supply voltage VDD. The first power rail 714 and the metal tracks 716 reside in a first metallization layer M0.

Figure 7E:
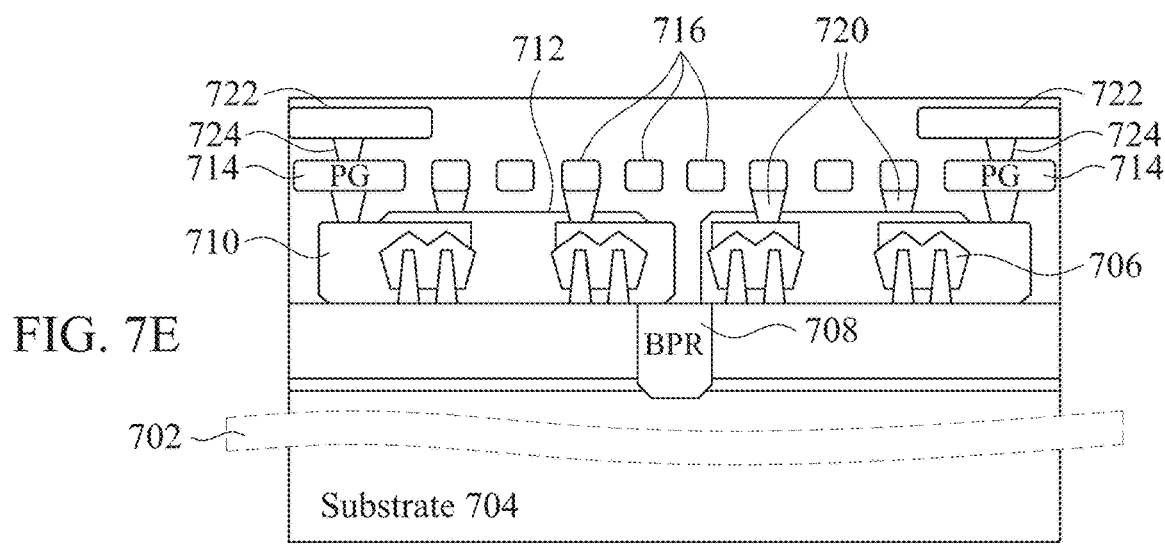

At operation 610, second metal tracks 722 are formed using a back end of line (BEOL) process, as shown in FIG. 7E. The BEOL process involves forming the metal wiring between the device structures 706 in order to interconnect them including forming contacts, interconnect wires, via structures, and dielectric structures. The second metal tracks 722 are on a via structure 724 connected to the first power rail 714. In other embodiments, the BEOL process is used to form additional conductive metal structures after the second metal tracks 722 have been formed. The second metal tracks reside in a second metallization layer M1.

Figure 7F:
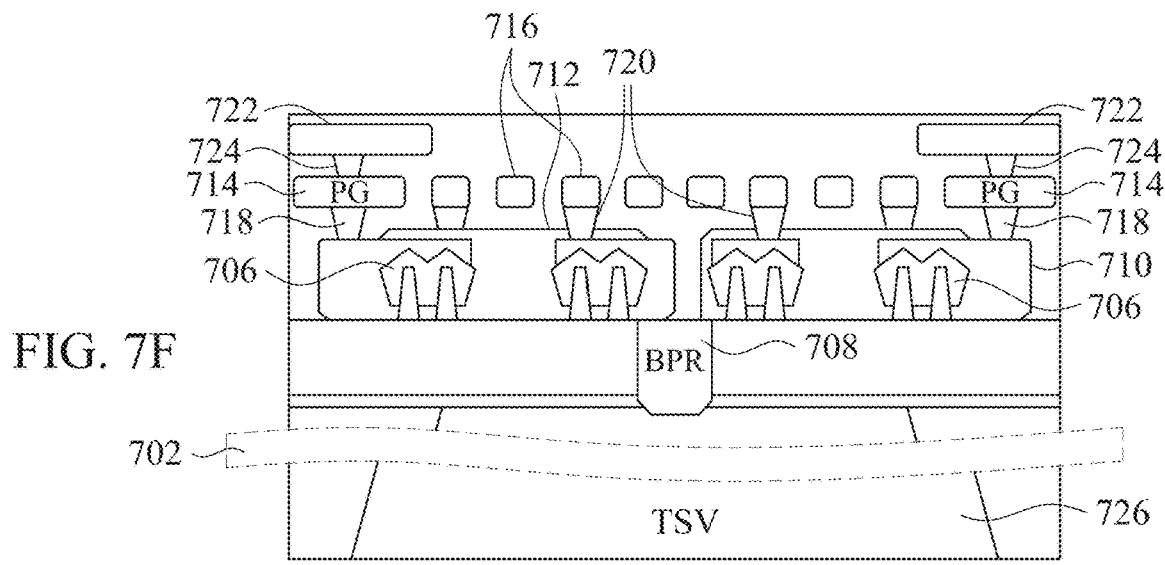

At operation 612, the through silicon via (TSV) 726 is formed in the substrate 704, as shown in FIG. 7F. The substrate 704 is etched and lined with a barrier against copper diffusion. A seed layer is deposited prior to filling the etched region with copper using some form of aqueous deposition or the like to form TSV 726. Details regarding an embodiment of a process usable to form a TSV are found in U.S. Pat. No. 9,087,878 issued Jul. 21, 2015, which is incorporated herein by reference in its entirety. The second BPR 710 is in contact with and electrically coupled to the TSV 726 to provide the backside power.

FIG. 8 is a flowchart of a method 800 of forming HPR structure 400 (FIG. 4), in accordance with one or more embodiments. FIGS. 9A-9F are diagrams of the HPR structure 400 at various manufacturing stages corresponding to the operations of method 800, in accordance with some embodiments. Method 800 is operable to form HPR structure 400, discussed above with respect to FIG. 4, and HPR structure 900 is usable as HPR structure 400, in some embodiments.

The sequence in which the operations of method 800 are depicted in FIG. 8 is for illustration only; the operations of method 800 are capable of being executed in sequences that differ from that depicted in FIG. 8. In some embodiments, operations in addition to those depicted in FIG. 8 are performed before, between, and/or after the operations depicted in FIG. 8.

Figure 9A:
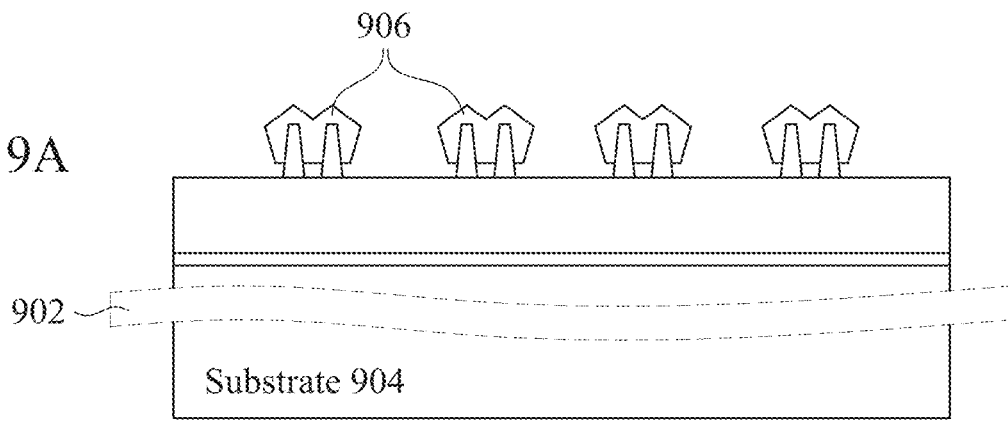
FIGS. 9A-9F are diagrams of an HPR structure at various manufacturing stages corresponding to the method of FIG. 6, in accordance with some embodiments.

At operation 802, a stop layer 902 is formed before device structures 906 are formed, as shown in FIG. 9A. The stop layer 902 is formed by depositing on the substrate 904 silicon nitride, silicon oxy-nitride, silicon carbide, or carbon-doped silicon nitride or the like. Details regarding an embodiment of a process usable to form a stop layer are found in U.S. Pat. No. 9,589,803 issued Mar. 7, 2017, which is incorporated herein by reference in its entirety. Afterwards, the device structures 906 are formed on the substrate 904 using the device process.

Figure 9B:
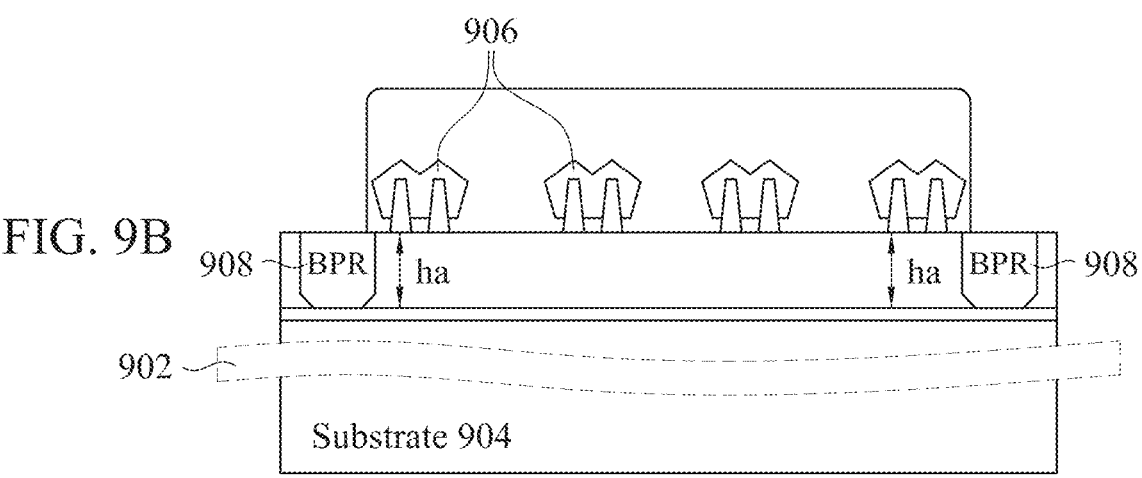

At operation 804, a trench process is used to form a first trench in the substrate 904. The trench process involves etching the substrate 704 using techniques including wet etching, dry etching, sputtering etching o the like. Details regarding an embodiment of a process usable to form a trench are found in U.S. Pat. No. 10,115,679 issued Mar. 13, 2018, which is incorporated herein by reference in its entirety. Once the first trench is formed, conductive material is deposited in the first trench to form the first BPR 908. The first BPR 908 includes a height ha, as shown in FIG. 9B.

Figure 9C:
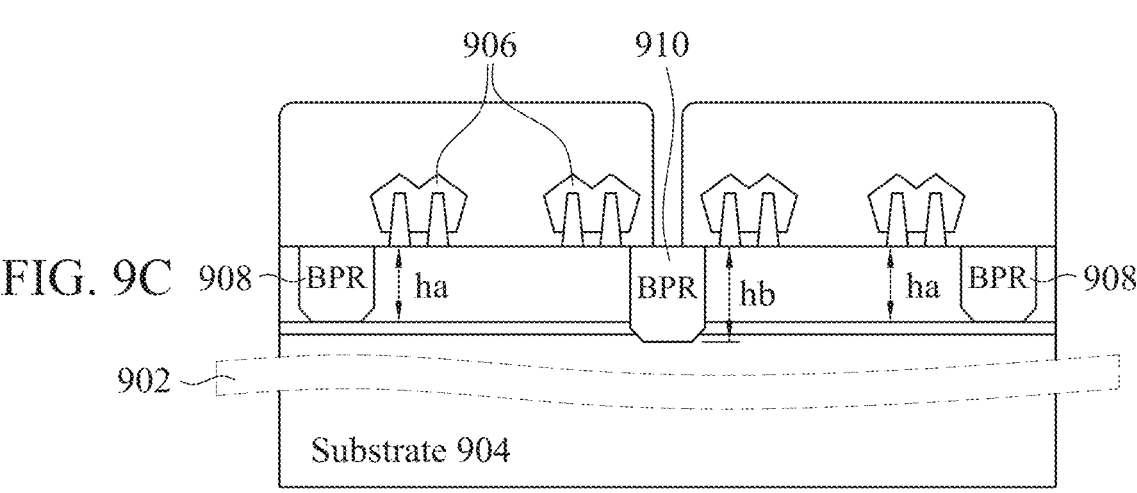

At operation 806, the trench process is used to form a second trench. After the second trench is formed, conductive material is deposited in the second trench to form the second BPR 910. The second BPR 910 includes a height hb. The heights ha and hb are not equivalent for reasons discussed herein to minimize the risk of short circuit, as shown in FIG. 9C.

Figure 9D:
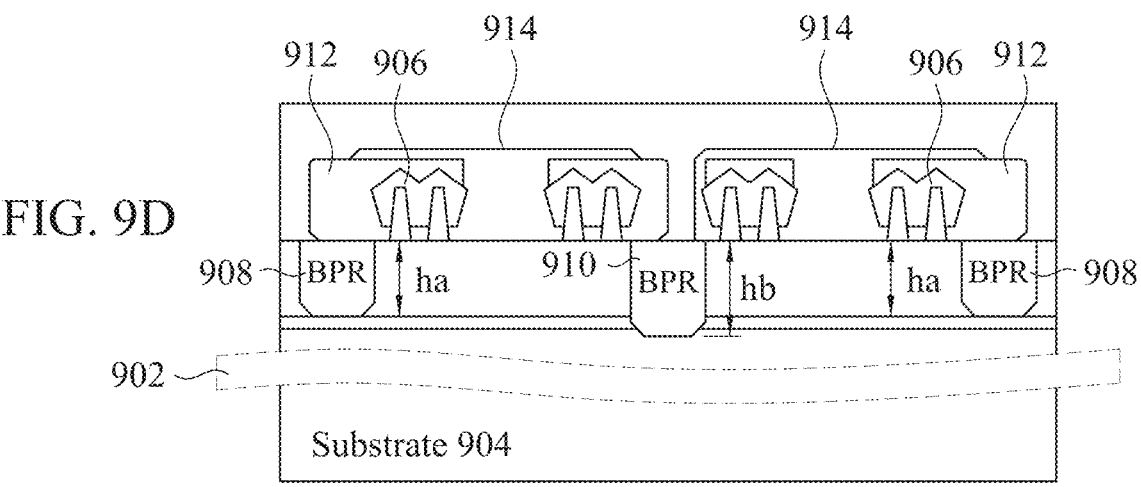

At operation 808, local metal connections 912 are formed for the first buried power rail 908, the second buried power rail 910, and the device structures 906. The polysilicon gate structures 914 are formed on the substrate 904. A certain number of device structures 906 are within the polysilicon gate structures 914. The local metal connections 912 are used to form the source and drain of the device structures 906, as shown in FIG. 9D.

Figure 9E:
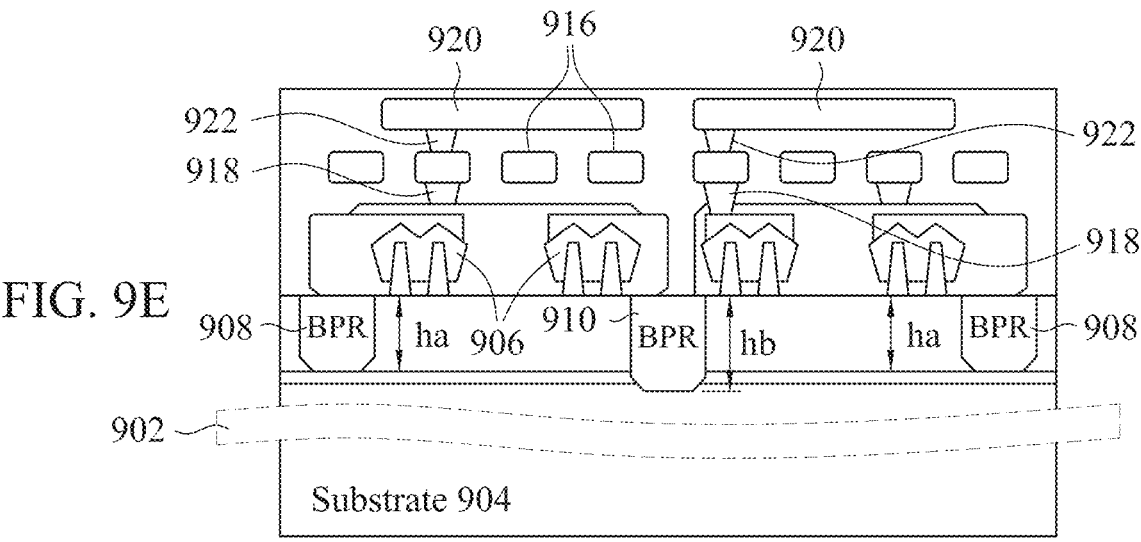

At operation 810, the first metal tracks 916 are formed using a BEOL process, as shown in FIG. 9E. The BEOL process involves forming the metal wiring between the device structures 906 in order to interconnect them including forming contacts, interconnect wires, via structures, and dielectric structures. A select number of the first metal tracks 916 are on via structures 918 for electrical connections. Second metal tracks 920 are formed using the BEOL process. A select number of the second metal tracks 920 are positioned on via structures 922 that are connected to the select number of first metal tracks 916. Moreover, the first metal tracks 916 reside in a first metallization layer and the second metal tracks 920 reside in a second metallization layer. In other embodiments, the BEOL process is used to form additional metal tracks after the second metal tracks 920.

Figure 9F:
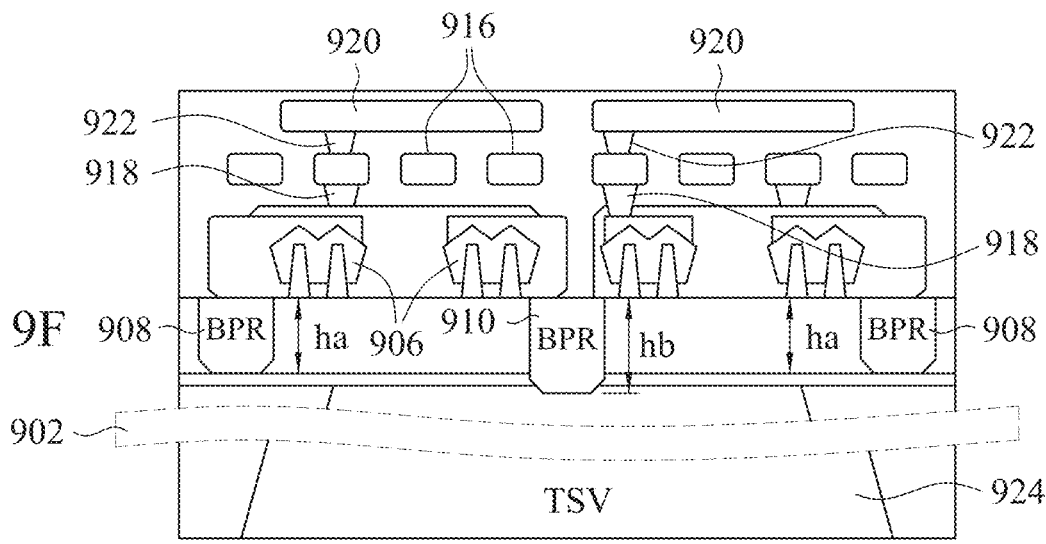

At operation 812, a TSV 924 is formed in the substrate 904. The substrate 904 is etched and lined with a barrier against copper diffusion. A seed layer is deposited prior to filling the etched region with copper using some form of aqueous deposition or the like to form TSV 924. Details regarding an embodiment of a process usable to form a TSV are found in U.S. Pat. No. 9,087,878 issued Jul. 21, 2015, which is incorporated herein by reference in its entirety. The TSV 924 is in contact with and electrically coupled to the second BPR 910 to provide the backside power, as shown in FIG. 9F.

Figure 10:
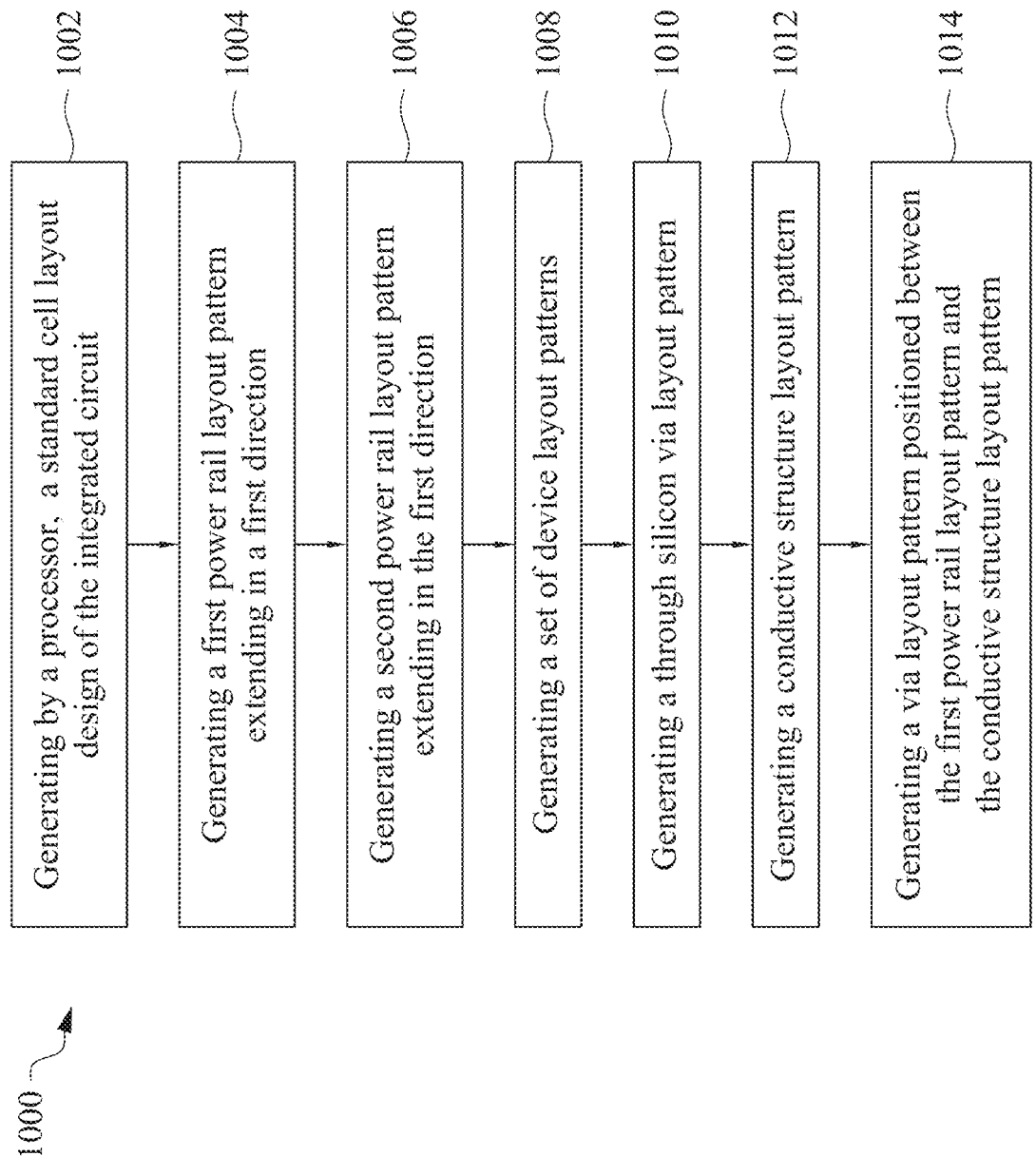
FIG. 10 is a flowchart of a method of generating a cell layout design of an IC with the HPR structure of FIG. 1 or FIG. 3, in accordance with one or more embodiments.

FIG. 10 is a flowchart of a method 1000 of generating a cell layout design of an IC with the HPR structure 300 or 500 (FIG. 3 or FIG. 5), in accordance with one or more embodiments.

In step 1002, the method 1000 includes generating, by a processor (e.g., processor 1102 of FIG. 11), a cell layout design of the integrated circuit, and manufacturing the integrated circuit based on the cell layout design.

In step 1004, the method 1000 includes generating the cell layout design comprises generating a first power rail layout pattern, such as 302 or 502 (FIG. 3 or FIG. 5), extending in a first direction (FIGS. 3 and 5, X-axis). In some embodiments, the first power rail layout pattern corresponds to fabricating a first power rail that is embedded in a substrate and configured to provide a first supply voltage.

In step 1006, the method 1000 includes generating the cell layout design further comprises generating a second power rail layout pattern, such as 304 or 504 (FIG. 3 or FIG. 5), extending in the first direction, such as the X-axis (FIG. 3 or FIG. 5), and being separated from the first power rail layout pattern in a second direction, such as the Y-axis (FIG. 3 or FIG. 5), different from the first direction. In some embodiments, the second power rail layout pattern corresponds to fabricating a second power rail embedded in the substrate and configured to provide a second supply voltage different from the first supply voltage.

In step 1008, the method 1000 includes generating the cell layout design further comprises generating a set of device layout patterns, such as 306 or 506 (FIG. 3 or FIG. 5), positioned between the first power rail layout pattern and the second power rail layout pattern, being located above the first power rail layout pattern and the second power rail layout pattern. In some embodiments, the set of device layout patterns corresponds to fabricating a set of devices.

In step 1010, the method 1000 includes generating the cell layout design further comprises generating a through silicon via layout pattern, such as 338 or 508 (FIG. 3 or FIG. 5), corresponding to fabricating a through silicon via. In some embodiments, the through silicon via extends through the backside of the substrate, and is electrically coupled to the second power rail.

In step 1012, the method 1000 includes generating the cell layout design further comprises generating a conductive structure layout pattern, such as 242 or 360 (FIG. 2A or FIG. 4), extending in at least the first direction or the second direction, being above the set of device layout patterns, the first power rail layout pattern and the second power rail layout pattern. In some embodiments, the conductive structure layout pattern corresponds to fabricating a conductive structure electrically coupled to the first power rail.

In step 1014, the method 1000 includes generating the cell layout design further including generating a via layout pattern, such as via 240 or 458 (FIG. 2A or FIG. 4), positioned between the first power rail layout pattern and the conductive structure layout pattern, and corresponding to fabricating a via. In some embodiments, the via electrically couples the first power rail to the conductive structure.

In some embodiments, the integrated circuit further includes one or more first cells.

In some embodiments, a set of active region layout patterns is usable to manufacture a corresponding set of active regions of IC. In some embodiments, set of active regions of IC is referred to as an active region of the IC which defines the source or drain diffusion regions of the IC.

Figure 11:
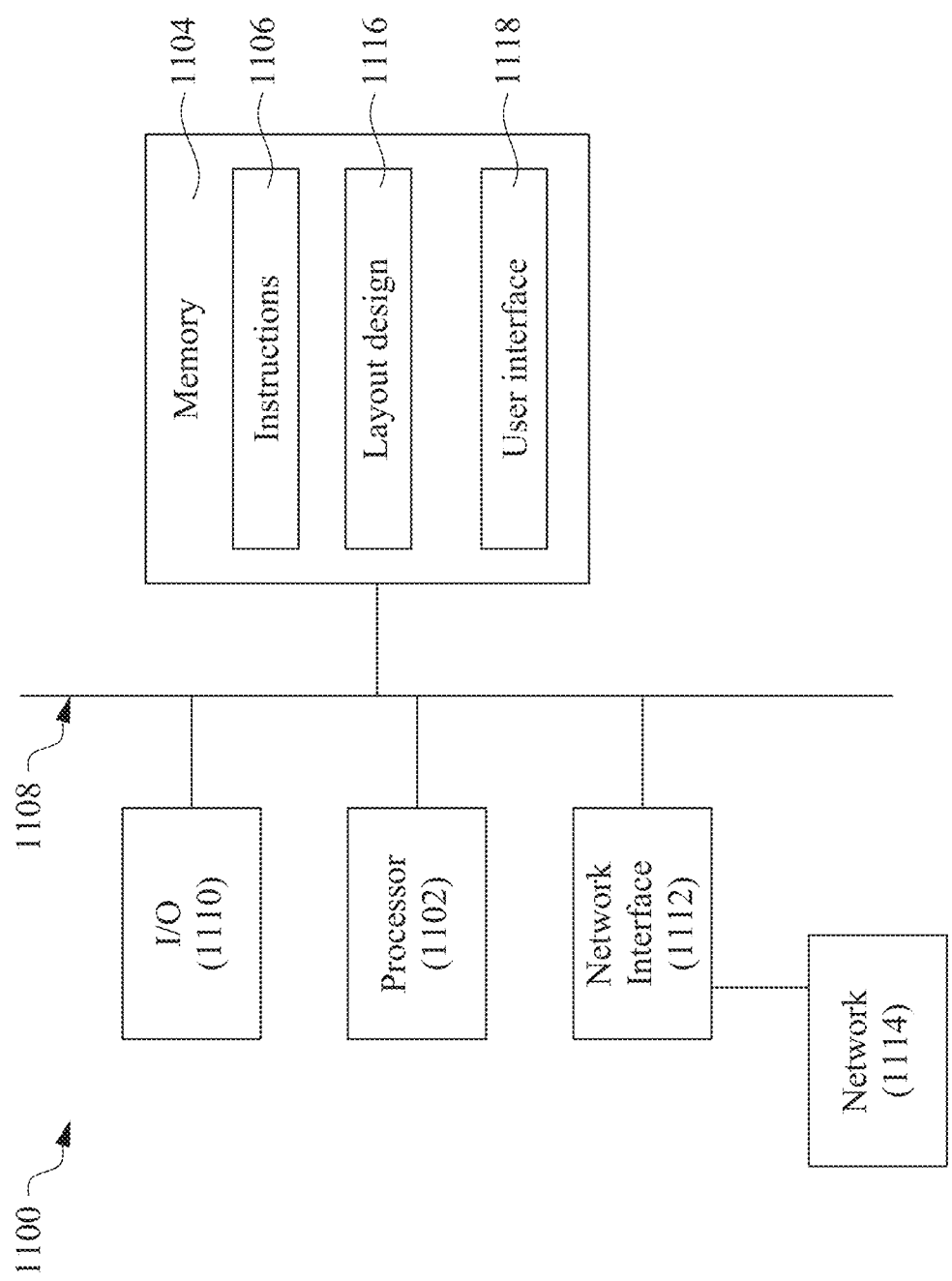
FIG. 11 is a schematic view of a system for designing an IC layout design, in accordance with some embodiments.

FIG. 11 is a schematic view of a system 1100 for designing an IC layout design in accordance with some embodiments. In some embodiments, system 1100 generates or places one or more IC layout designs described herein. System 1100 includes a hardware processor 1102 and a non-transitory, computer readable storage medium 1104 encoded with, i.e., storing, the computer program code 1106, i.e., a set of executable instructions. Computer readable storage medium 1104 is configured for interfacing with manufacturing machines for producing the integrated circuit. The processor 1102 is electrically coupled to the computer readable storage medium 1104 via a bus 1108. The processor 1102 is also electrically coupled to an I/O interface 1110 by bus 1108. A network interface 1112 is also electrically connected to the processor 1102 via bus 1108. Network interface 1112 is connected to a network 1114, so that processor 1102 and computer readable storage medium 1104 are capable of connecting to external elements via network 1114. The processor 1102 is configured to execute the computer program code 1106 encoded in the computer readable storage medium 1104 in order to cause system 1100 to be usable for performing a portion or all of the operations as described in method 1000.

In some embodiments, the processor 1102 is a central processing unit (CPU), a multi-processor, a distributed processing system, an application specific integrated circuit (ASIC), and/or a suitable processing unit.

In some embodiments, the computer readable storage medium 1104 is an electronic, magnetic, optical, electromagnetic, infrared, and/or a semiconductor system (or apparatus or device). For example, the computer readable storage medium 904 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 904 includes a compact disk-read only memory (CD-ROM), a compact disk-read/write (CD-R/W), and/or a digital video disc (DVD).

In some embodiments, the storage medium 1104 stores the computer program code 1106 configured to cause system 1100 to perform method 1000. In some embodiments, the storage medium 1104 also stores information needed for performing method 1000 as well as information generated during performing method 1000, such as layout design 1116 and user interface 1118, and/or a set of executable instructions to perform the operation of method 1000. In some embodiments, layout design 1116 comprises one or more of layout designs.

In some embodiments, the storage medium 1104 stores instructions (e.g., computer program code 1106) for interfacing with manufacturing machines. The instructions (e.g., computer program code 1106) enable processor 1102 to generate manufacturing instructions readable by the manufacturing machines to effectively implement method 1000 during a manufacturing process.

System 1100 includes I/O interface 1110. I/O interface 1110 is coupled to external circuitry. In some embodiments, I/O interface 1110 includes a keyboard, keypad, mouse, trackball, trackpad, and/or cursor direction keys for communicating information and commands to processor 1102.

System 1100 also includes network interface 1112 coupled to the processor 1102. Network interface 1112 allows system 1100 to communicate with network 1114, to which one or more other computer systems are connected. Network interface 1112 includes wireless network interfaces such as BLUETOOTH, WIFI, WIMAX, GPRS, or WCDMA; or wired network interface such as ETHERNET, USB, or IEEE-1394. In some embodiments, method 1000 is implemented in two or more systems 1100, and information such as layout design, and user interface are exchanged between different systems 1100 by network 1114.

System 1100 is configured to receive information related to a layout design through I/O interface 1110 or network interface 1112. The information is transferred to processor 1102 by bus 1108 to determine a layout design for producing IC 200 or 400. The layout design is then stored in computer readable medium 1104 as layout design 1116. System 1100 is configured to receive information related to a user interface through I/O interface 1110 or network interface 1112. The information is stored in computer readable medium 1104 as user interface 1118.

In some embodiments, method 1000 is implemented as a standalone software application for execution by a processor. In some embodiments, method 1000 is implemented as a software application that is a part of an additional software application. In some embodiments, method 1000 is implemented as a plug-in to a software application. In some embodiments, method 1000 is implemented as a software application that is a portion of an EDA tool. In some embodiments, method 1000 is implemented as a software application that is used by an EDA tool. In some embodiments, the EDA tool is used to generate a layout of the integrated circuit device. In some embodiments, the layout is stored on a non-transitory computer readable medium. In some embodiments, the layout is generated using a tool such as VIRTUOSO® available from CADENCE DESIGN SYSTEMS, Inc., or another suitable layout generating tool. In some embodiments, the layout is generated based on a netlist which is created based on the schematic design. In some embodiments, method 1000 is implemented by a manufacturing device to manufacture an integrated circuit using a set of masks manufactured based on one or more layout designs generated by system 1100. System 1100 of FIG. 11 generates layout designs of an integrated circuit that are smaller than other approaches.

System 1100 of FIG. 11 generates layout designs of integrated circuit structure that occupy less area and have consume less power than other approaches. In some embodiments system 1100 is a MBFF banking/de-banking engine.

Figure 12:
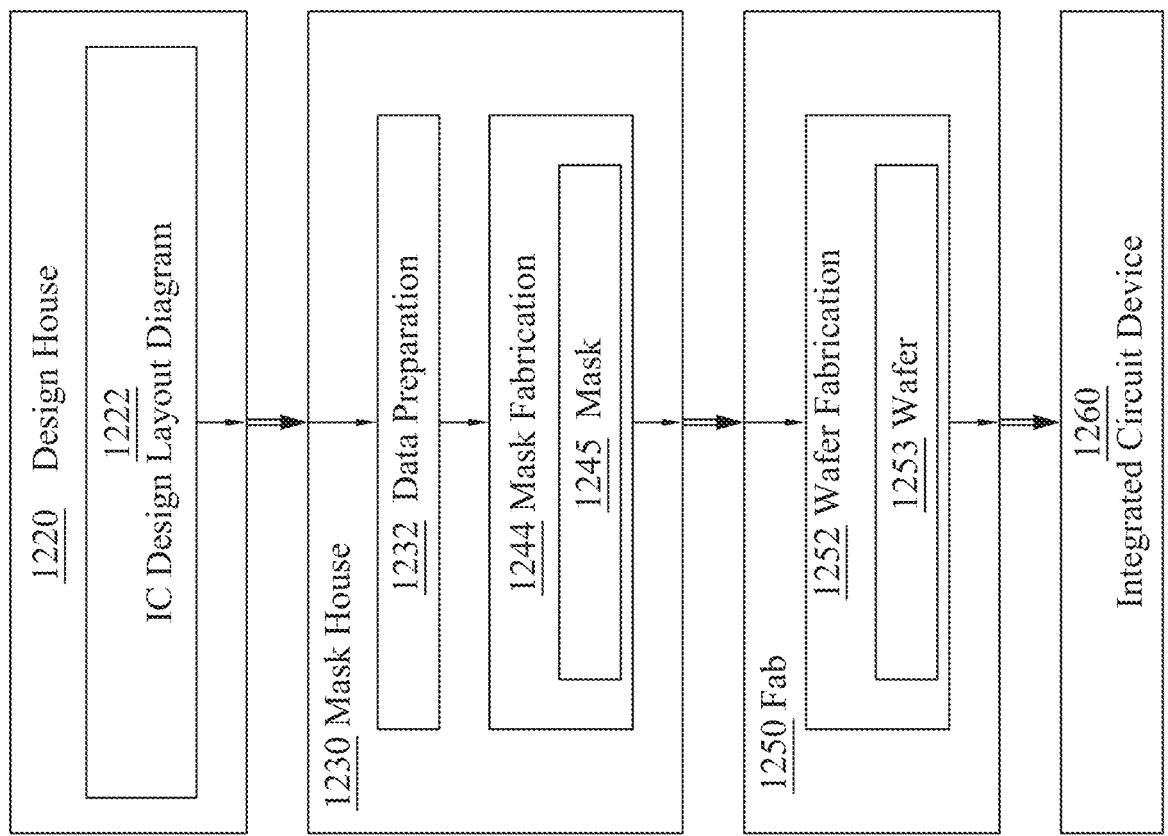
FIG. 12 is a block diagram of an IC manufacturing system, and an IC manufacturing flow associated therewith, in accordance with some embodiments.

FIG. 12 is a block diagram of an integrated circuit (IC) manufacturing system 1000, and an IC manufacturing flow associated therewith, in accordance with at least one embodiments of the present disclosure.

In FIG. 12, IC manufacturing system 1200 includes entities, such as a design house 1220, a mask house 1240, and an IC manufacturer/fabricator ("fab") 1240, that interact with one another in the design, development, and manufacturing cycles and/or services related to manufacturing an IC device 1260. The entities in system 1200 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1220, mask house 1240, and IC fab 1240 is owned by a single larger company. In some embodiments, two or more of design house 1220, mask house 1240, and IC fab 1240 coexist in a common facility and use common resources.

Design house (or design team) 1220 generates an IC design layout 1222. IC design layout 1222 includes various geometrical patterns designed for an IC device 1260. The geometrical patterns correspond to patterns of metal, oxide, or semiconductor layers that make up the various components of IC device 1260 to be fabricated. The various layers combine to form various IC features. For example, a portion of IC design layout 1222 includes various IC features, such as an active region, gate electrode, source electrode and drain electrode, metal lines or vias of an interlayer interconnection, and openings for bonding pads, to be formed in a semiconductor substrate (such as a silicon wafer) and various material layers positioned on the semiconductor substrate. Design house 1220 implements a proper design procedure to form IC design layout 1222. The design procedure includes one or more of logic design, physical design or place and route. IC design layout 1222 is presented in one or more data files having information of the geometrical patterns. For example, IC design layout 1222 can be expressed in a GDSII file format or DFII file format.

Mask house 1240 includes data preparation 1252 and mask fabrication 1244. Mask house 1240 uses IC design layout 1222 to manufacture one or more masks to be used for fabricating the various layers of IC device 1260 according to IC design layout 1222. Mask house 1240 performs mask data preparation 1252, where IC design layout 1222 is translated into a representative data file ("RDF"). Mask data preparation 1252 provides the RDF to mask fabrication 1244. Mask fabrication 1244 includes a mask writer. A mask writer converts the RDF to an image on a substrate, such as a mask (reticle) or a semiconductor wafer. The design layout is manipulated by mask data preparation 1252 to comply with particular characteristics of the mask writer and/or requirements of IC fab 1240. In FIG. 12, mask data preparation 1252 and mask fabrication 1244 are illustrated as separate elements. In some embodiments, mask data preparation 1252 and mask fabrication 1244 can be collectively referred to as mask data preparation.

In some embodiments, mask data preparation 1252 includes optical proximity correction (OPC) which uses lithography enhancement techniques to compensate for image errors, such as those that can arise from diffraction, interference, other process effects and the like. OPC adjusts IC design layout 1222. In some embodiments, mask data preparation 1252 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1252 includes a mask rule checker (MRC) that checks the IC design layout that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout to compensate for limitations during mask fabrication 1244, which may undo part of the modifications performed by OPC in order to meet mask creation rules.

In some embodiments, mask data preparation 1252 includes lithography process checking (LPC) that simulates processing that will be implemented by IC fab 1240 to fabricate IC device 1260. LPC simulates this processing based on IC design layout 1222 to create a simulated manufactured device, such as IC device 1260. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout 1222.

It should be understood that the above description of mask data preparation 1252 has been simplified for the purposes of clarity. In some embodiments, data preparation 1252 includes additional features such as a logic operation (LOP) to modify the IC design layout according to manufacturing rules. Additionally, the processes applied to IC design layout 1222 during data preparation 1252 may be executed in a variety of different orders.

After mask data preparation 1252 and during mask fabrication 1244, a mask or a group of masks are fabricated based on the modified IC design layout. In some embodiments, an electron-beam (e-beam) or a mechanism of multiple e-beams is used to form a pattern on a mask (photomask or reticle) based on the modified IC design layout. The mask can be formed in various technologies. In some embodiments, the mask is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM. The mask(s) generated by mask fabrication 944 is used in a variety of processes. For example, such a mask(s) is used in an ion implantation process to form various doped regions in the semiconductor wafer, in an etching process to form various etching regions in the semiconductor wafer, and/or in other suitable processes.

IC fab 1240 is an IC fabrication business that includes one or more manufacturing facilities for the fabrication of a variety of different IC products. In some embodiments, IC Fab 1240 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1240 uses the mask (or masks) fabricated by mask house 1240 to fabricate IC device 1260. Thus, IC fab 1240 at least indirectly uses IC design layout 1222 to fabricate IC device 1260. In some embodiments, a semiconductor wafer 1252 is fabricated by IC fab 1240 using the mask (or masks) to form IC device 1260. Semiconductor wafer 1252 includes a silicon substrate or other proper substrate having material layers formed thereon. Semiconductor wafer further includes one or more of various doped regions, dielectric features, multilevel interconnects, and the like (formed at subsequent manufacturing steps).

Details regarding an integrated circuit (IC) manufacturing system (e.g., system 1000 of FIG. 10), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

An aspect of this description is related to an integrated circuit structure that includes a substrate having a front side and a back side, the back side being an opposite side of the substrate from the front side. A first power rail extends in a first direction, being embedded in the front side of the substrate and configured to provide a first supply voltage. A second power rail is configured to provide a second supply voltage different from the first supply voltage, the second power rail extending in the first direction, being embedded in the front side of the substrate and being separated from the first power rail in a second direction different from the first direction. A first device is positioned between the first power rail and the second power rail and located on the front side of the substrate. A first via structure extends to the back side of the substrate and is electrically coupled to the second power rail.

Another aspect of this description is related to a method of forming an integrated circuit (IC) that includes generating, by a processor, a cell layout design of the integrated circuit. The generating of the cell layout design includes generating a first power rail layout pattern extending in a first direction and corresponding to a first power rail in a front side of a substrate and configured to provide a first supply voltage, and generating a second power rail layout pattern extending in the first direction and separated from the first power rail layout pattern in a second direction different from the first direction, the second power rail layout pattern corresponding to a second power rail in the front side of the substrate and configured to provide a second supply voltage different from the first supply voltage. Also, the method includes generating a set of first device layout patterns positioned between the first power rail layout pattern and the second power rail layout pattern and corresponding to a set of devices. Moreover, the method includes generating a first via layout pattern corresponding to a first via structure, the first via structure extending to a backside of the substrate and electrically coupled to the second power rail. Furthermore, the method includes manufacturing the integrated circuit based on the cell layout design.

A further aspect of this description includes an integrated circuit that includes a substrate having a front side and a back side, the back side being an opposite side of the substrate from the front side. A hybrid power rail structure at least partially embedded in the front side of the substrate. The hybrid power rail includes a first buried power rail configured to provide a first supply voltage, and a second buried power rail coupled to the first buried power rail and configured to provide a second supply voltage. The integrated circuit includes a via structure electrically coupled to the second buried power rail and configured to provide backside power.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit comprising:
   a substrate having a front side and a back side, the back side being an opposite side of the substrate from the front side;
   a first power rail extending in a first direction, being embedded in the front side of the substrate and configured to provide a first supply voltage, wherein the first power rail has a first height between the front side and the back side;
   a second power rail configured to provide a second supply voltage different from the first supply voltage, the second power rail extending in the first direction, being embedded in the front side of the substrate and being separated from the first power rail in a second direction different from the first direction, wherein the second power rail has a second height between the front side and the back side, the second height being greater than the first height;
   a first device positioned between the first power rail and the second power rail, and located on the front side of the substrate; and
   a first via structure extending to the back side of the substrate and electrically coupled to the second power rail.

2. The integrated circuit of claim 1, wherein the first power rail comprises a metal layer positioned on the first device.

3. The integrated circuit of claim 1, wherein the second power rail is a buried power rail.

4. The integrated circuit of claim 1, wherein the first power rail is electrically coupled to a conductive device.

5. The integrated circuit of claim 4, wherein the conductive device extends in the first direction in a layer above the first device, the first power rail and the second power rail.

6. The integrated circuit of claim 4, wherein the first power rail is electrically coupled to the conductive device through a second via structure.

7. The integrated circuit of claim 1, wherein the first supply voltage and the second supply voltage are of different values.

8. The integrated circuit of claim 1, wherein the first via structure is a through silicon via.

9. The integrated circuit of claim 1, wherein the first device comprises passive devices and active devices.

10. An integrated circuit comprising:
a substrate having a front side and a back side, the back side being an opposite side of the substrate from the front side;
a hybrid power rail structure at least partially embedded in the front side of the substrate comprising:
a first buried power rail extending in a first direction and configured to provide a first supply voltage and having a first height that extends between the front side and the back side of the substrate;
a second buried power rail extending in the first direction and configured to provide a second supply voltage, the second buried power rail being separated from the first buried power rail in a second direction different from the first direction and having a second height greater than the first height; and
a via structure electrically coupled to the second buried power rail and configured to provide backside power.

11. The integrated circuit of claim 10, wherein the first buried power rail comprises a bottom protective layer.

12. The integrated circuit of claim 10, wherein the via structure is a through silicon via.

13. An integrated circuit comprising:
a substrate having a first direction extending from a back side of the substrate to a front side of the substrate;
a first power rail embedded in the front side of the substrate positioned at a first height along the first direction and extending in a second direction perpendicular to the first direction;
a second power rail embedded in the front side of the substrate and being separated from the first power rail in a third direction different from the first and second direction and positioned at a second height along the first direction and extending in the second direction, the second height being closer to the back side of the substrate than the first height;
a device structure positioned between the first power rail and the second power rail; and
a first via structure extending from the back side of the substrate to the second power rail.

14. The integrated circuit of claim 13, wherein the device structure comprises a plurality of conductive structures extending in the first direction and positioned at a first level.

15. The integrated circuit of claim 14, wherein the plurality of conductive structures comprises a total of four conductive structures positioned between the first power rail and the second power rail.

16. The integrated circuit of claim 13, further comprising:
a third power rail positioned at the first height and parallel to the first power rail; and
a fourth power rail positioned at the second height and parallel to the second power rail,
wherein
the first and third power rails are configured to provide a first supply voltage, and
the second and fourth power rails are configured to provide a second supply voltage different from the first supply voltage.

17. The integrated circuit of claim 16, further comprising:
a second via structure extending from the back side of the substrate to the second power rail;
a third via structure extending from the back side of the substrate to the fourth power rail; and
a fourth via structure extending from the back side of the substrate to the fourth power rail.

18. The integrated circuit of claim 13, wherein the device structure comprises a plurality of gate structures extending in a third direction perpendicular to each of the first and second directions, the plurality of gate structures being positioned at a third height between the first and second heights.

19. The integrated circuit of claim 18, wherein
the first power rail overlies the plurality of gate structures, and
the plurality of gate structures overlies the second power rail.

20. The integrated circuit of claim 13, wherein the second height along the first direction is greater than the first height along the first direction.

* * * * *